US012727006B2

(12) United States Patent
Ko et al.

(10) Patent No.: US 12,727,006 B2
(45) Date of Patent: Sep. 1, 2026

(54) METHOD AND APPARATUS FOR PERFORMING SIDELINK TRANSMISSION ON BASIS OF PUCCH PROCESSING TIME IN NR V2X

(71) Applicant: LG ELECTRONICS INC., Seoul (KR)

(72) Inventors: Woosuk Ko, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 544 days.

(21) Appl. No.: 17/919,902

(22) PCT Filed: Apr. 19, 2021

(86) PCT No.: PCT/KR2021/004855

§ 371 (c)(1), (2) Date: Oct. 19, 2022

(87) PCT Pub. No.: WO2021/215757

PCT Pub. Date: Oct. 28, 2021

(65) Prior Publication Data

US 2023/0164803 A1 May 25, 2023

Related U.S. Application Data

(60) Provisional application No. 63/012,873, filed on Apr. 20, 2020, provisional application No. 63/012,251, filed on Apr. 19, 2020.

(51) Int. Cl.

| | |
|---|---|
| ***H04L 1/18*** | (2023.01) |
| ***H04L 1/1829*** | (2023.01) |
| ***H04W 72/25*** | (2023.01) |

(52) U.S. Cl.
CPC ........... *H04W 72/25* (2023.01); *H04L 1/1854* (2013.01)

(58) Field of Classification Search
None
See application file for complete search history.

(56) References Cited

U.S. PATENT DOCUMENTS 11,659,578 B2 * 5/2023 Hosseini ............... H04W 72/23 370/329
2019/0007176 A1 1/2019 Ozturk et al.
(Continued)

OTHER PUBLICATIONS

"Sidelink resource allocation mechanism mode 1 for NR V2x" NTT Docomo, 3GPP TSG RAN WG1, R1-1911169, Oct. 2019 (Year: 2019).*

(Continued)

*Primary Examiner* — Abdullahi Ahmed
*Assistant Examiner* — Ahmed Saifuddin
(74) *Attorney, Agent, or Firm* — LEE, HONG, DEGERMAN, KANG & WAIMEY

(57) ABSTRACT

Proposed is a method by which a first device performs wireless communication. The method may comprise the steps of: receiving, from a base station, information related to a first physical uplink control channel (PUCCH) resource and information related to a time gap between a physical sidelink feedback channel (PSFCH) and a PUCCH; transmitting sidelink control information (SCI) to a second device through a physical sidelink control channel (PSCCH); transmitting sidelink data to the second device through a physical sidelink shared channel (PSSCH) related to the PSCCH; determining a PSFCH resource on the basis of an index of a slot and an index of a subchannel which are related to the PSSCH, wherein, on the basis of the fact that a time gap between the determined PSFCH resource and the first PUCCH resource is smaller than the time gap between (Continued)

the PSFCH and the PUCCH, the first device drops transmission of a hybrid automatic repeat request (HARQ) feedback related to the sidelink data on the first PUCCH resource; receiving, from the base station, information related to a second PUCCH resource, on the basis of the transmission of the HARQ feedback being dropped; and transmitting an acknowledgment (ACK) related to the sidelink data to the base station on the basis of the second PUCCH resource.

7 Claims, 19 Drawing Sheets

(56) References Cited

U.S. PATENT DOCUMENTS

2020/0099479 A1 3/2020 Park
2021/0050953 A1* 2/2021 Park .................. H04W 72/1263
2021/0136781 A1* 5/2021 Hosseini ............... H04L 1/1854
2021/0321396 A1* 10/2021 Li ......................... H04W 72/23
2021/0377989 A1* 12/2021 Chae ..................... H04L 1/1854
2022/0183002 A1* 6/2022 Yeo ....................... H04L 1/1854
2022/0210739 A1* 6/2022 Yi ......................... H04L 5/0037
2022/0217741 A1* 7/2022 Yoshioka ............. H04W 72/02
2022/0224457 A1* 7/2022 Ebrahim Rezagah ....................... H04L 1/1861
2022/0399917 A1* 12/2022 Shin ...................... H04L 1/1858
2023/0246742 A1* 8/2023 Yoshioka .......... H04W 72/1268 370/329

OTHER PUBLICATIONS

NTT Docomo, Inc., "Remaining issues on resource allocation mechanism mode 1," 3GPP TSG-RAN WG1 #100bis, e-Meeting, R1-2002438, Apr. 2020, 19 pages.
Samsung, "On Mode 2 for NR Sidelink" 3GPP TSG-RAN WG1 #100bis, e-Meeting, R1-2002126, Apr. 2020, 10 pages.
Apple, "On Remaining Details of Mode 1 Resource Allocation," 3GPP TSG-RAN WG1 #100bis, e-Meeting, R1-2002324, Apr. 2020, 10 pages.
Intel Corporation, "Solutions to Remaining Opens of Resource Allocation Mode-2 for NR V2X Sidelink Design," 3GPP TSG-RAN WG1 #100bis, e-Meeting, R1-2001994, Apr. 2020, 23 pages.
PCT International Application No. PCT/KR2021004855, International Search Report dated Jul. 23, 2021, 4 pages.
European Patent Office Application Serial No. 21792039.6, Search Report dated Apr. 10, 2024, 12 pages.
Vivo, "Remaining issues on mode 1 resource allocation mechanism," 3GPP TSG RAN WG1 #100bis, R1-2001660, Apr. 2020, 19 pages.
NTT Docomo Inc., "Sidelink resource allocation mechanism mode 1 for NR V2X," 3GPP TSG RAN WG1 #98bis, R1-1911169, Oct. 2019, 10 pages.

* cited by examiner

FIG. 3

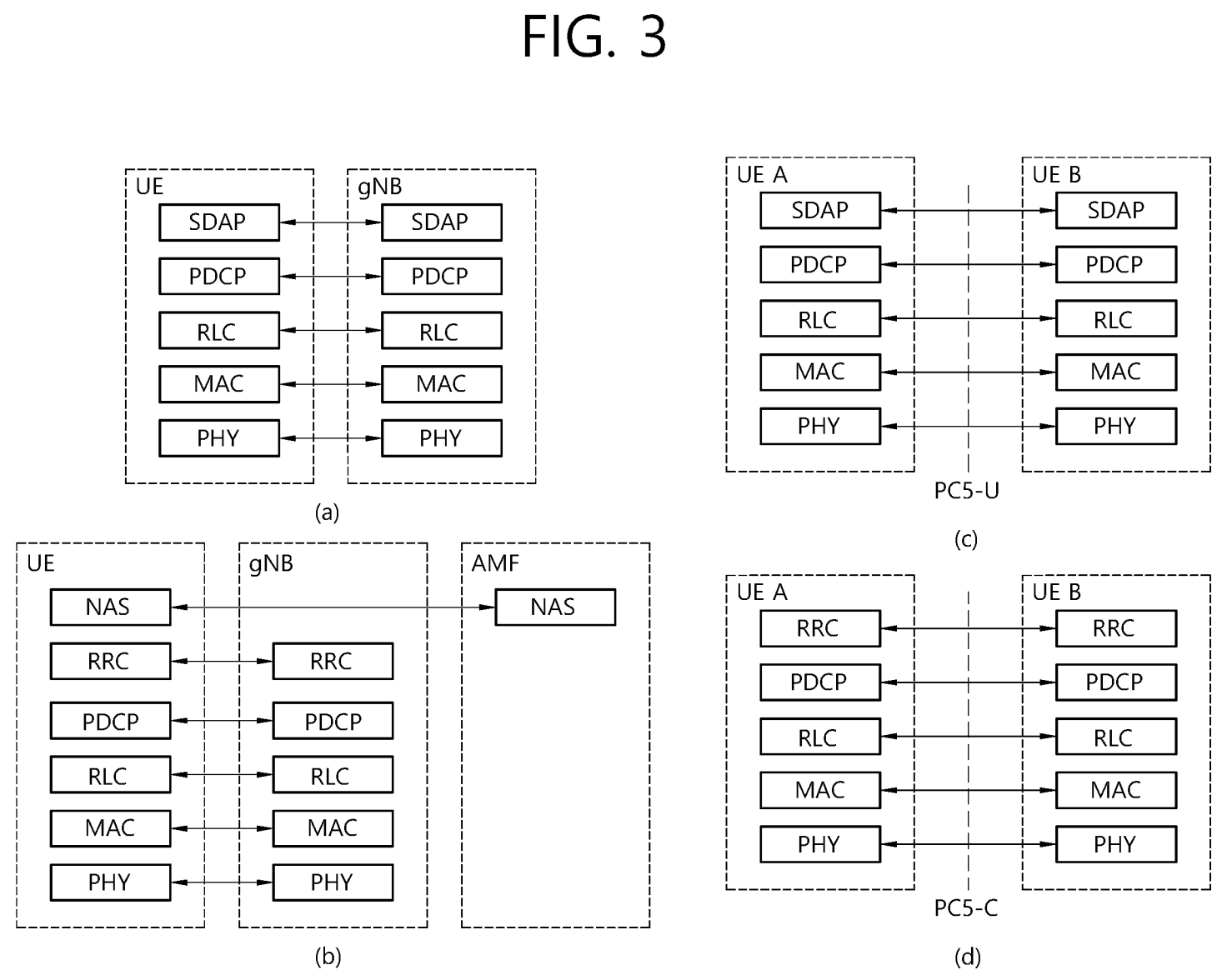

UE
SDAP
PDCP
RLC
MAC
PHY
gNB
SDAP
PDCP
RLC
MAC
PHY
(a)

UE
NAS
RRC
PDCP
RLC
MAC
PHY
gNB
RRC
PDCP
RLC
MAC
PHY
AMF
NAS
(b)

UE A
SDAP
PDCP
RLC
MAC
PHY
PC5-U
UE B
SDAP
PDCP
RLC
MAC
PHY
(c)

UE A
RRC
PDCP
RLC
MAC
PHY
PC5-C
UE B
RRC
PDCP
RLC
MAC
PHY
(d)

FIG. 5

Resource grid k=0 l=0

1 RE 1 symbol

1subcarrier

1RB=12 subcarriers

A BWP

A carrier
(up to 3300 subcarriers,
i.e., 275 RBs)

1
Home Appliance
100e
150a
Hand-held device
100d
XR device
100c
Vehicle
100b-2
150b
Vehicle
100b-1
Network (5G)
300
200
200a
150c
IoT device
100f
AI Server/device
400
Robot
100a

Figure 19:
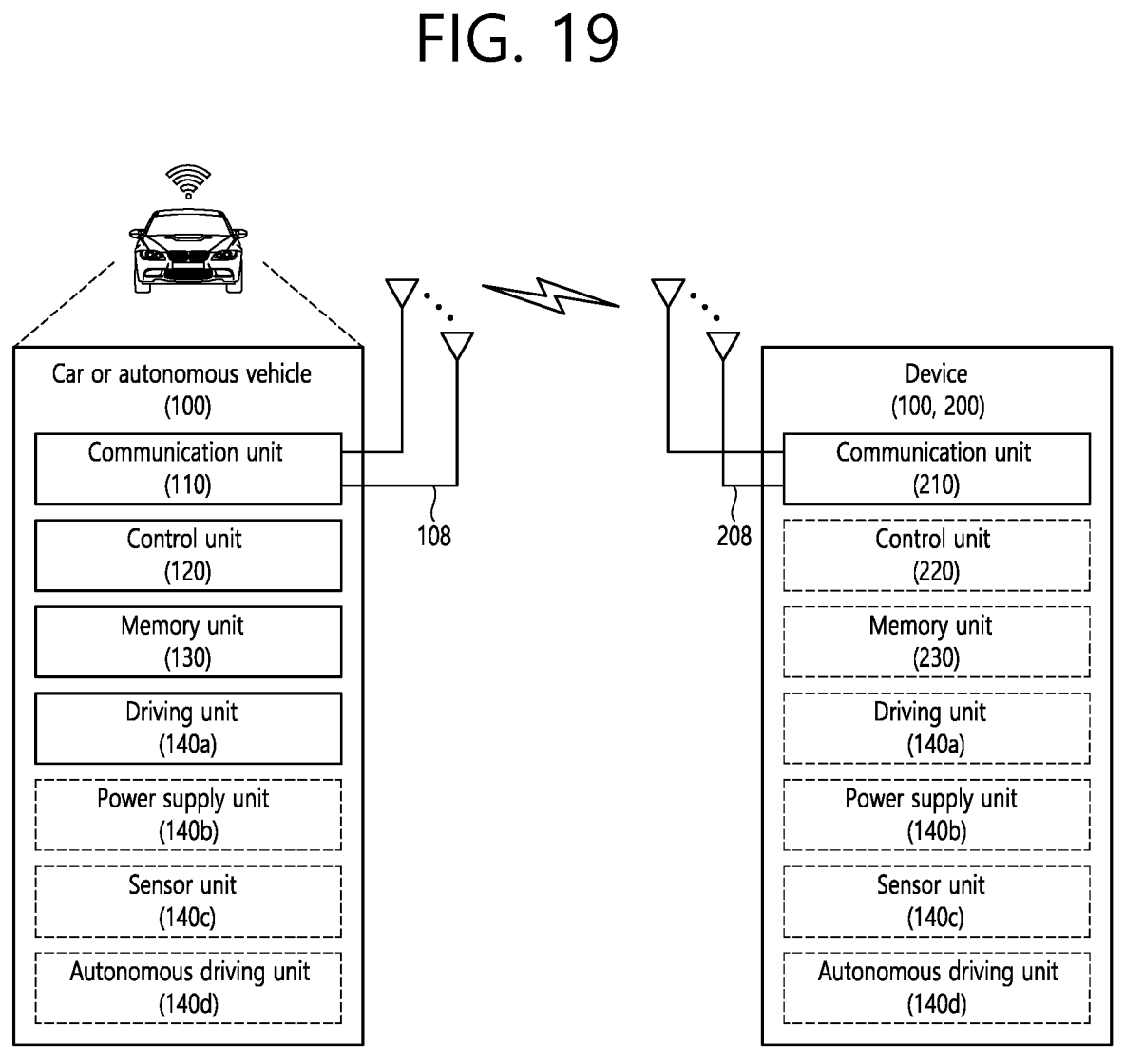

Car or autonomous vehicle (100)

Communication unit (110)

Control unit (120)

Memory unit (130)

Driving unit (140a)

Power supply unit (140b)

Sensor unit (140c)

Autonomous driving unit (140d)

108

208

Device (100, 200)

Communication unit (210)

Control unit (220)

Memory unit (230)

Driving unit (140a)

Power supply unit (140b)

Sensor unit (140c)

Autonomous driving unit (140d)

METHOD AND APPARATUS FOR PERFORMING SIDELINK TRANSMISSION ON BASIS OF PUCCH PROCESSING TIME IN NR V2X

CROSS-REFERENCE TO RELATED APPLICATIONS

This application is the National Stage filing under 35 U.S.C. 371 of International Application No. PCT/KR2021/004855, filed on Apr. 19, 2021, and claims the benefit of U.S. Provisional Application Nos. 63/012,251, filed on Apr. 19, 2020, and 63/012,873, filed on Apr. 20, 2020, the contents of which are all incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Meanwhile, in sidelink mode-1 transmission, a UE may report sidelink hybrid automatic repeat request (HARQ) feedback to a base station through a physical uplink control channel (PUCCH). For example, a base station may configure a UE to report sidelink HARQ feedback through a PUCCH. For example, a base station may allocate a necessary retransmission resource to a UE according to a feedback content of the UE. In this case, for example, a transmitting UE may configure/determine a physical sidelink feedback channel (PSFCH) received from a receiving UE as a timing reference, the transmitting UE may report an HARQ feedback to a base station through a PUCCH resource located after a PUCCH offset from a PSFCH time point configured by the base station to the transmitting UE through DCI.

In the above operation, when the timing (e.g., system frame number (SFN)) used by a base station and the timing (e.g., direct frame number (DFN)) used by a UE are different from each other, the base station may not accurately determine the timing used by the UE. Therefore, after a transmitting UE receives a PSFCH from a receiving UE, and if the processing time required for the transmitting UE to report an HARQ feedback to a base station through a PUCCH is longer than a PUCCH timing configured by the base station, the transmitting UE may not be able to transmit an HARQ feedback to the base station through a PUCCH at the timing configured by the base station.

According to an embodiment of the present disclosure, a method for performing, a first device, wireless communication is proposed. The method may comprise: receiving information related to a first physical uplink control channel (PUCCH) resource and information related to a time gap between a physical sidelink feedback channel (PSFCH) and a PUCCH from a base station; transmitting sidelink control information (SCI) to a second device through a physical sidelink control channel (PSCCH); transmitting sidelink data, to the second device, through a physical sidelink shared channel (PSSCH) related to the PSCCH; determining a PSFCH resource, based on an index of a subchannel related to the PSSCH and an index of a slot, wherein the first device drops a transmission of a hybrid automatic repeat request (HARQ) feedback related to the sidelink data on the first PUCCH resource, based on a time gap between the determined PSFCH resource and the first PUCCH resource being smaller than the time gap between a PSFCH and a PUCCH; receiving information related to a second PUCCH resource, from the base station, based on the transmission of the HARQ feedback being dropped; and transmitting an acknowledgement (ACK) related to the sidelink data to the base station, based on the second PUCCH resource.

According to an embodiment of the present disclosure, a first device for performing wireless communication is proposed. The first device may comprising: one or more memories storing instructions; one or more transceivers; and one or more processors connected to the one or more memories and the one or more transceivers, wherein the one or more processors execute the instructions to: receive information related to a first physical uplink control channel (PUCCH) resource and information related to a time gap between a physical sidelink feedback channel (PSFCH) and a PUCCH from a base station; transmit sidelink control information (SCI) to a second device through a physical sidelink control channel (PSCCH); transmit sidelink data, to the second device, through a physical sidelink shared channel (PSSCH) related to the PSCCH; determine a PSFCH resource, based on an index of a subchannel related to the PSSCH and an index of a slot, wherein the first device drops a transmission of a hybrid automatic repeat request (HARQ) feedback related to the sidelink data on the first PUCCH resource, based on a time gap between the determined PSFCH resource and the first PUCCH resource being smaller than the time gap between a PSFCH and a PUCCH; receive information related to a second PUCCH resource, from the base station, based on the transmission of the HARQ feedback being dropped; and transmit an acknowledgement (ACK) related to the sidelink data to the base station, based on the second PUCCH resource.

Effects of the Disclosure

The user equipment (UE) can efficiently perform SL communication.

BRIEF DESCRIPTION OF THE DRAWINGS

FIG. 3 shows a radio protocol architecture, based on an embodiment of the present disclosure.

FIG. 5 shows a structure of a slot of an NR frame, based on an embodiment of the present disclosure.

FIG. 17 shows another example of a wireless device, based on an embodiment of the present disclosure.

FIG. 19 shows a vehicle or an autonomous vehicle, based on an embodiment of the present disclosure.

DESCRIPTION OF EXEMPLARY EMBODIMENTS

Figure 1:
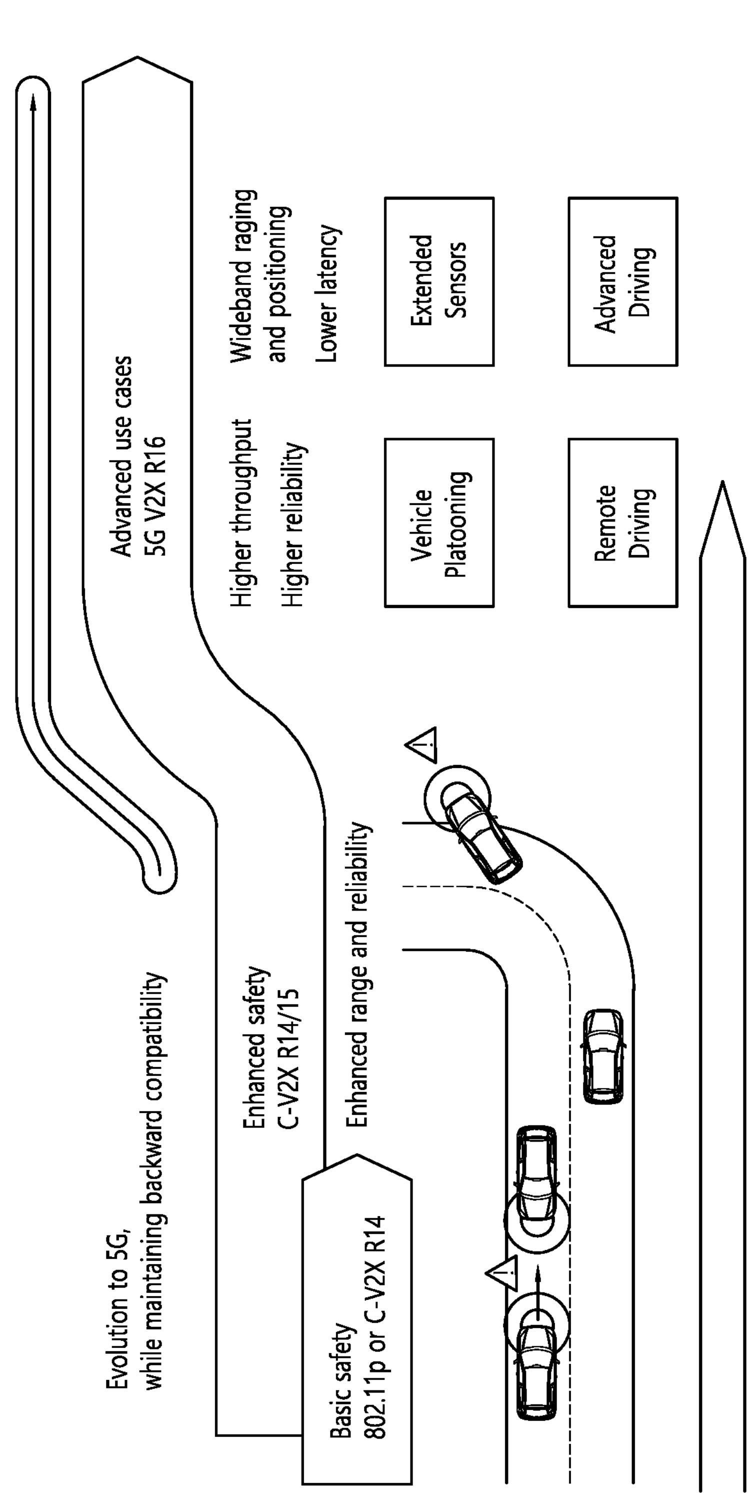
FIG. 1 is a drawing for describing V2X communication based on NR, compared to V2X communication based on RAT used before NR.

In the present specification, “A or B” may mean “only A”, “only B” or “both A and B.” In other words, in the present specification, “A or B” may be interpreted as “A and/or B”. For example, in the present specification, “A, B, or C” may mean “only A”, “only B”, “only C”, or “any combination of A, B, C”.

A slash (/) or comma used in the present specification may mean “and/or”. For example, “A/B” may mean “A and/or B”. Accordingly, “A/B” may mean “only A”, “only B”, or “both A and B”. For example, “A, B, C” may mean “A, B, or C”.

In the present specification, “at least one of A and B” may mean “only A”, “only B”, or “both A and B”. In addition, in the present specification, the expression “at least one of A or B” or “at least one of A and/or B” may be interpreted as “at least one of A and B”.

In addition, in the present specification, “at least one of A, B, and C” may mean “only A”, “only B”, “only C”, or “any combination of A, B, and C”. In addition, “at least one of A, B, or C” or “at least one of A, B, and/or C” may mean “at least one of A, B, and C”.

In addition, a parenthesis used in the present specification may mean “for example”. Specifically, when indicated as “control information (PDCCH)”, it may mean that “PDCCH” is proposed as an example of the “control information”. In other words, the “control information” of the present specification is not limited to “PDCCH”, and “PDCCH” may be proposed as an example of the “control information”. In addition, when indicated as “control information (i.e., PDCCH)”, it may also mean that “PDCCH” is proposed as an example of the “control information”.

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
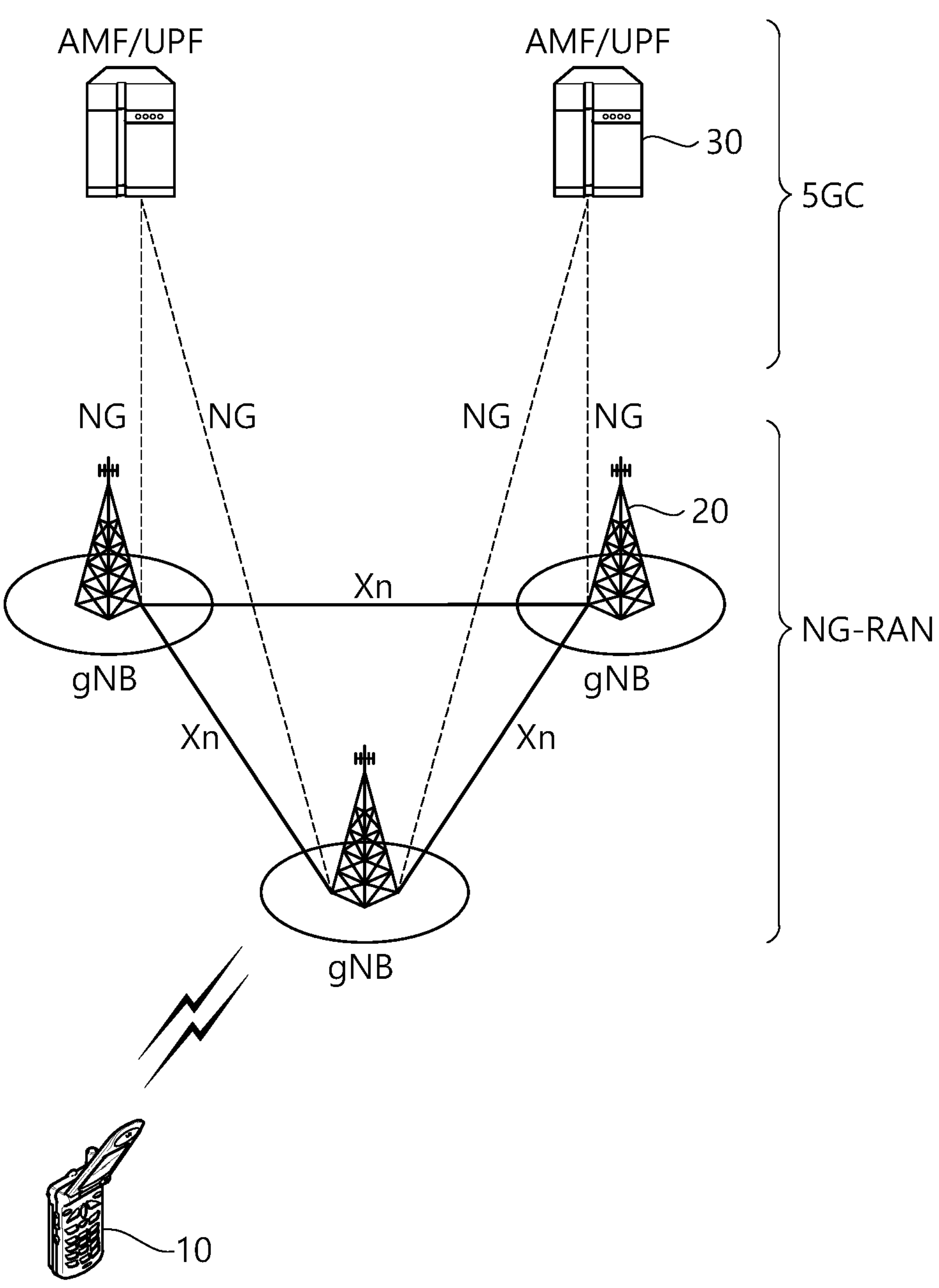
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
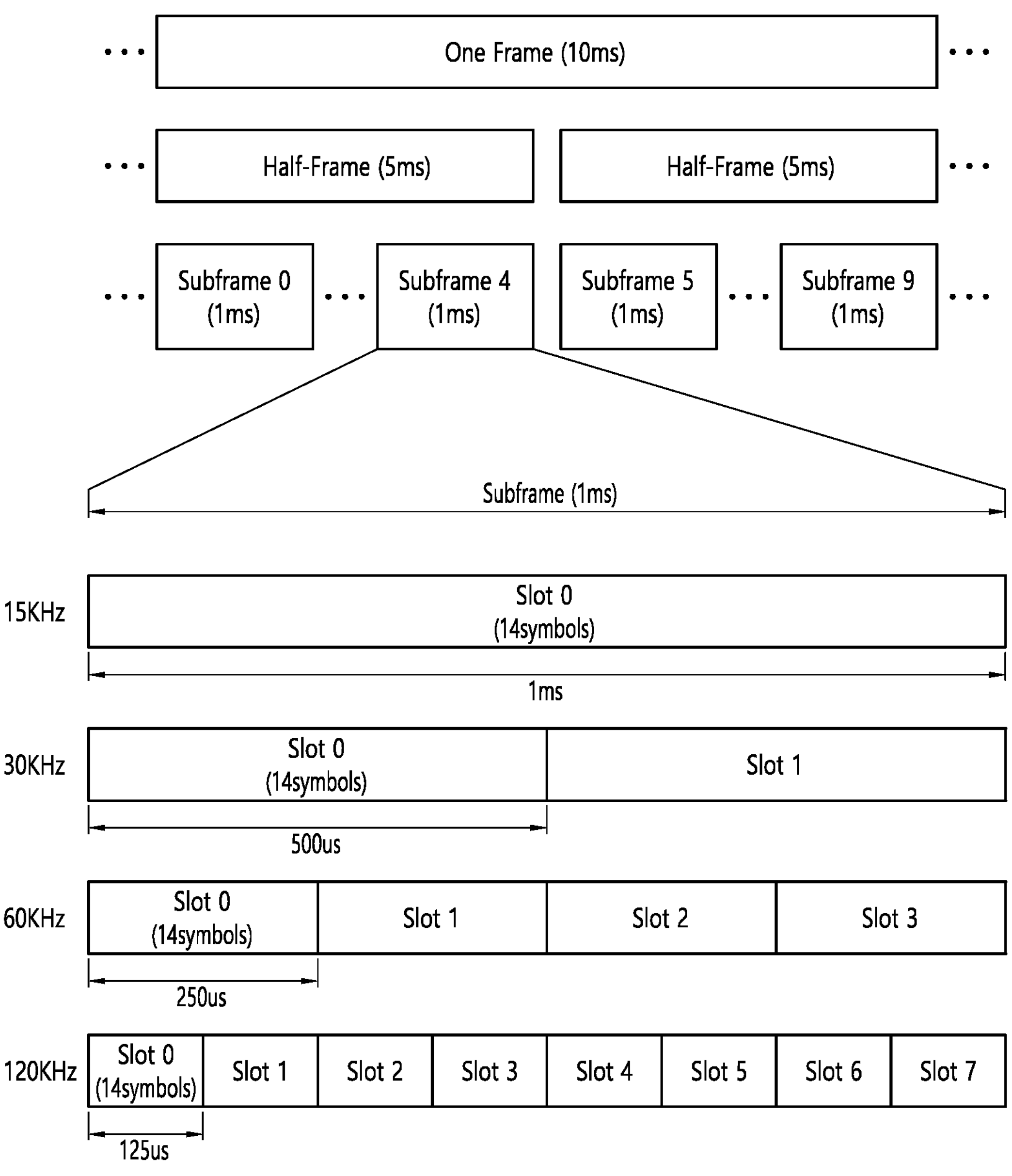
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
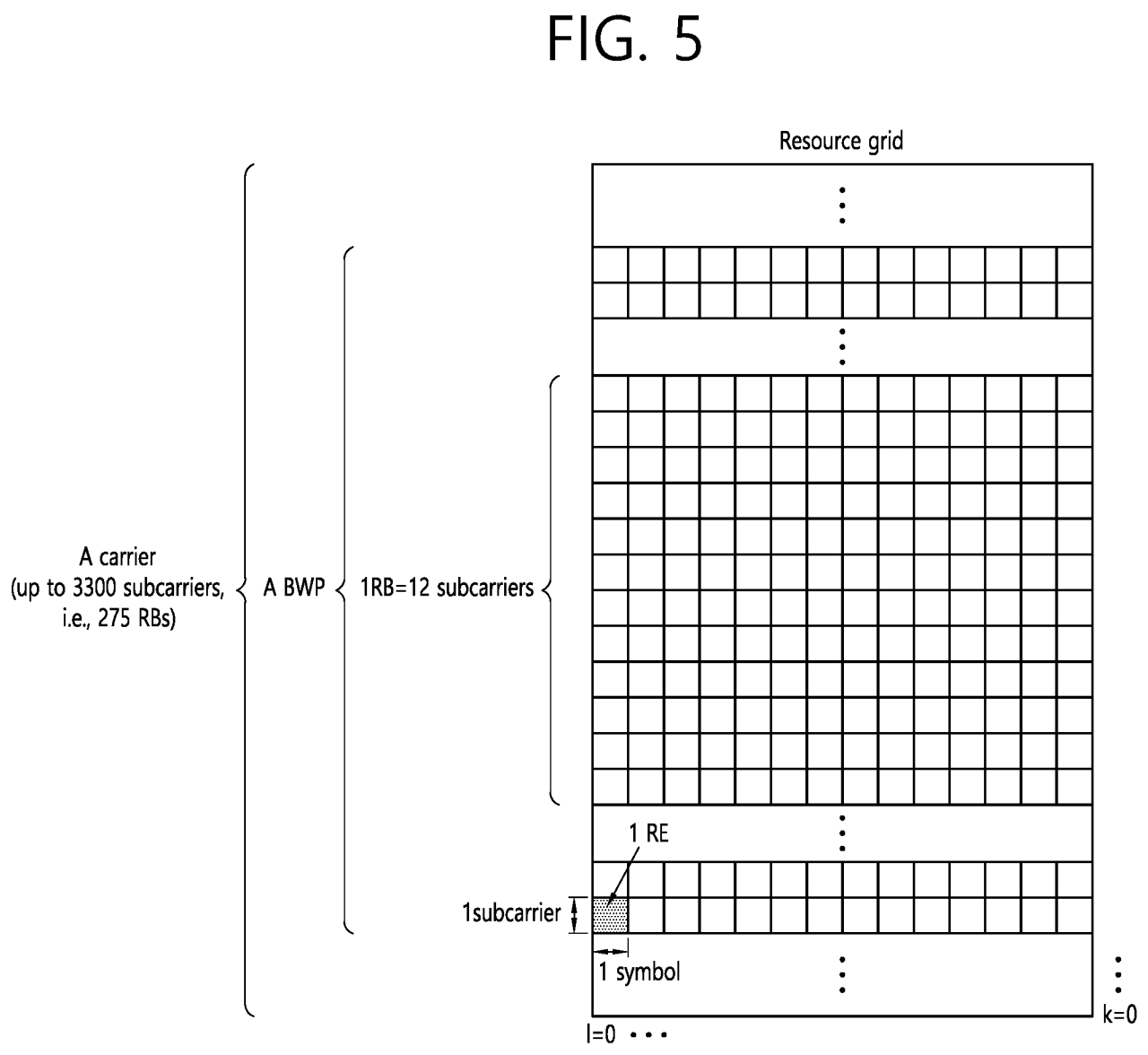

FIG. 5 shows a structure of a slot of an NR frame, based on an embodiment of the present disclosure. The embodiment of FIG. 5 may be combined with various embodiments of the present disclosure. Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
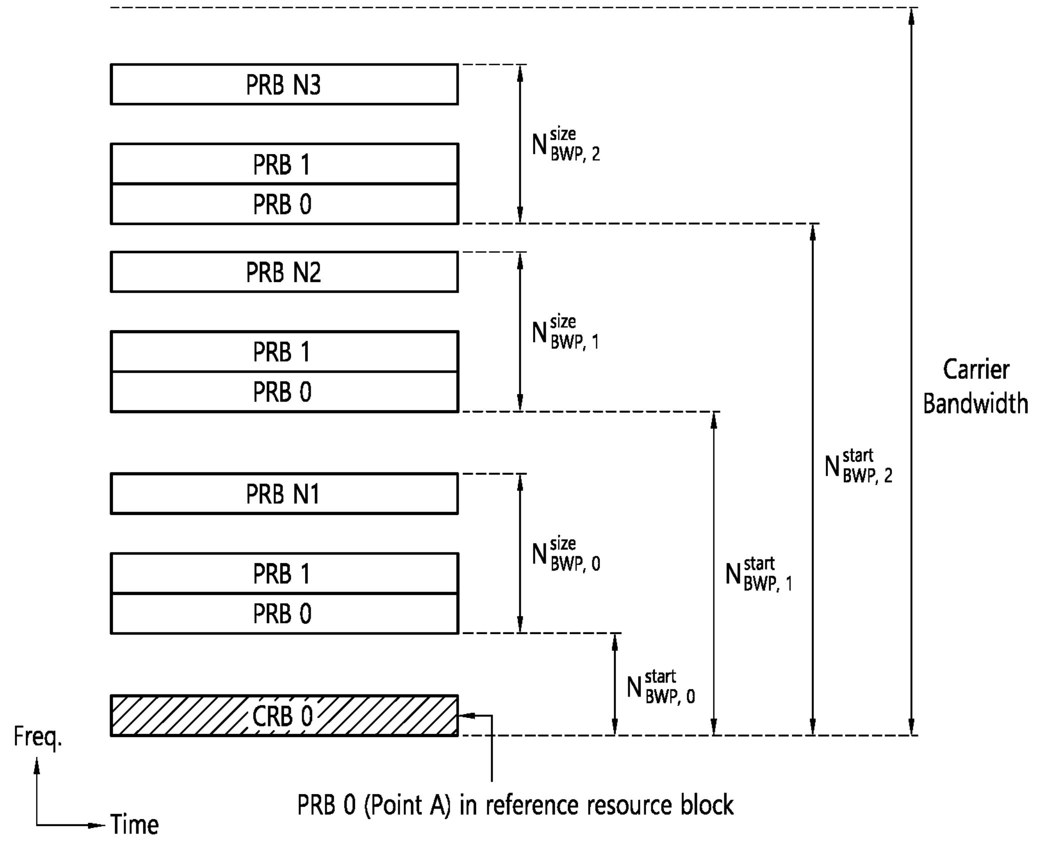
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PS SS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
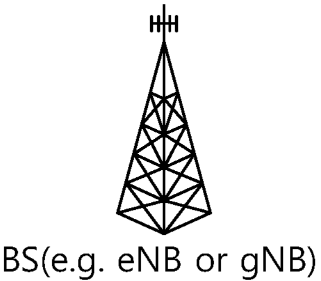
FIG. 7 shows a UE performing V2X or SL communication, based on an embodiment of the present disclosure.
Figure 7:

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
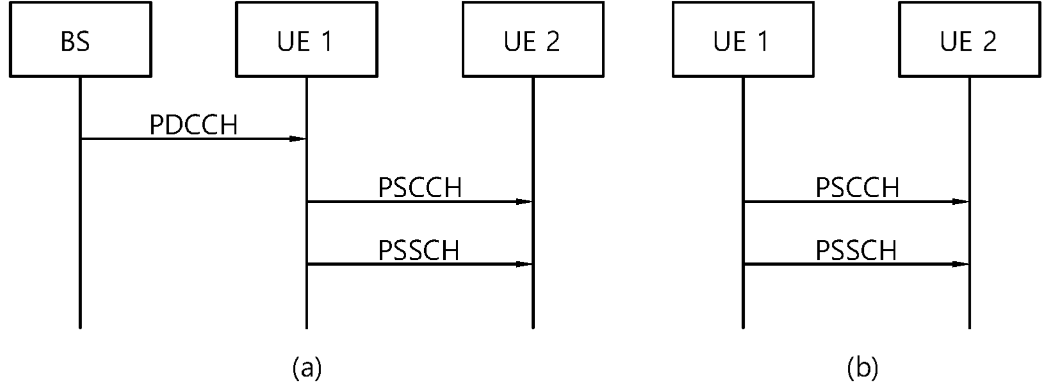
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
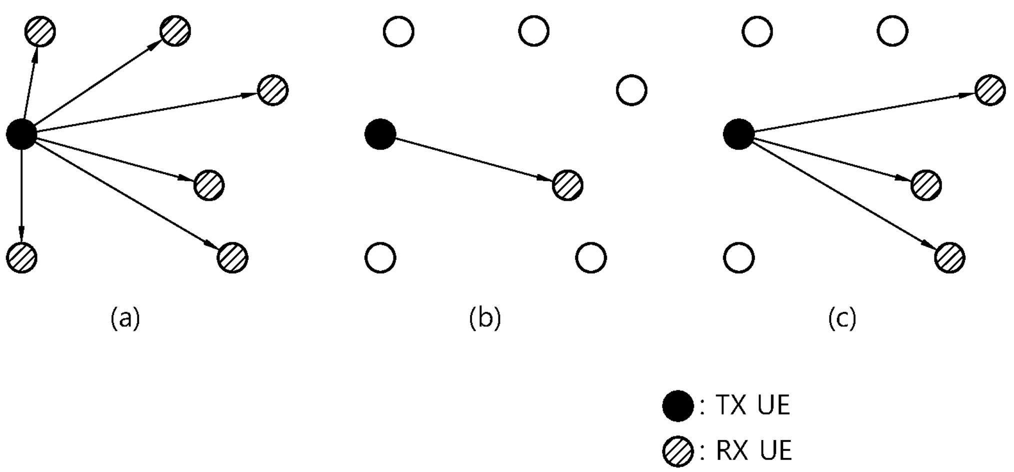
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like. Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

When SL HARQ feedback is enabled for unicast, in case of a non-code block group (non-CBG) operation, if a receiving UE successfully decodes a corresponding transport block, the receiving UE may generate HARQ-ACK. In addition, the receiving UE may transmit the HARQ-ACK to the transmitting UE. If the receiving UE cannot successfully decode the corresponding transport block after decoding the associated PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, a UE may determine whether to transmit a HARQ feedback based on a TX-RX distance and/or an RSRP. In the non-CBG operation, two HARQ feedback options may be supported for groupcast.

(1) Option 1: After the receiving UE decodes the associated PSCCH, if the receiving UE fails in decoding of a corresponding transport block, the receiving UE may transmit HARQ-NACK on a PSFCH. Otherwise, if the receiving UE may not transmit a signal on the PSFCH.

(2) Option 2: When a UE successfully decodes the corresponding transport block related to the PSCCH, the receiving UE may transmit the HARQ-ACK on the PSFCH. After the receiving UE decodes the associated PSCCH of which the target is the receiving UE, if the receiving UE fails in successfully decoding the corresponding transport block, the receiving UE may transmit the HARQ-NACK on the PSFCH.

In the case of mode 1 resource allocation, the time between HARQ feedback transmission on a PSFCH and a PSSCH may be (pre-)configured. In the case of unicast and groupcast, if retransmission is required on sidelink, this may be indicated to a base station by a UE within coverage using a PUCCH. A transmitting UE may transmit an indication to a serving base station of the transmitting UE in a form such as a Scheduling Request (SR)/Buffer Status Report (BSR) rather than the HARQ ACK/NACK form. In addition, even if a base station does not receive the indication, the base station can schedule a sidelink retransmission resource to a UE.

In the case of mode 2 resource allocation, the time between a HARQ feedback transmission on a PSFCH and a PSSCH may be (pre-)configured.

Meanwhile, in sidelink mode-1 transmission, a UE may report sidelink hybrid automatic repeat request (HARQ) feedback to a base station through a physical uplink control channel (PUCCH). For example, a base station may configure a UE to report sidelink HARQ feedback through PUCCH. For example, a base station may allocate a necessary retransmission resource to a UE according to a feedback content of the UE. In this case, for example, a transmitting UE may configure/determine a physical sidelink feedback channel (PSFCH) received from a receiving UE as a timing reference, the transmitting UE may report the HARQ feedback to a base station through a PUCCH resource located after a PUCCH offset from a PSFCH time point configured by the base station to the transmitting UE through DCI.

In the above operation, when the timing (e.g., system frame number (SFN)) used by a base station and the timing (e.g., direct frame number (DFN)) used by a UE are different from each other, the base station may not accurately determine the timing used by the UE. Accordingly, when a processing time required for a transmitting UE to report a HARQ feedback to a base station through a PUCCH after the transmitting UE receives a PSFCH from a receiving UE is greater than a PUCCH timing configured by the base station, the transmitting UE may not be able to transmit the HARQ feedback to the base station through the PUCCH at the timing configured by the base station.

In order to solve this problem, a UE may transmit a timing gap between an SFN and a DFN to a base station. At this time, even when a transmitting UE transmits a timing gap between an SFN and a DFN, a problem such as a time error may occur depending on the distance between a base station and the transmitting UE, the PUCCH timing configured by the base station may still be shorter than the PUCCH processing time required for the UE. The present disclosure describes an operation of a UE performing sidelink transmission in consideration of a PUCCH processing time.

According to an embodiment of the present disclosure, in order for a UE to guarantee the processing time required for the UE from a PSFCH to a PUCCH, the UE may report a timing gap between Uu link and sidelink to a base station. For example, in order to guarantee the processing time required for a transmitting UE from the time when the transmitting UE receives a PSFCH from a receiving UE to the time when the transmitting UE transmits a HARQ feedback to a base station through a PUCCH, the transmitting UE may report a timing gap between Uu link and SL to the base station (e.g., gNB).

For example, a transmitting UE may periodically transmit a timing gap between Uu link and SL to a base station. In this case, for example, a transmission period for a timing gap between Uu link and SL may be predefined, or may be pre-configured or configured from a base station/network to a transmitting UE.

For example, if the difference between DL timing and SL timing is more than a threshold, a transmitting UE may transmit a timing gap between Uu link and SL to a base station. In this case, for example, the threshold may be defined, or may be pre-configured or configured from a base station/network to a transmitting UE.

For example, if the difference value between a timing gap between Uu link and SL transmitted previously by a transmitting UE and a timing gap between Uu link and SL measured/required currently by a transmitting UE is greater than a threshold value, the transmitting UE may report a difference value, to a base station, between a timing gap between current Uu link and SL or a timing gap between Uu link previously transmitted by the transmitting UE and SL and a timing gap between Uu link and SL measured/required currently by the transmitting UE. In this case, for example, the threshold may be defined, or may be pre-configured or configured from a base station/network to a transmitting UE.

For example, when a transmitting UE changes a synchronization reference source to be used for sidelink communication, the transmitting UE may report a timing gap between Uu link and SL newly measured/required by the transmitting UE to a base station.

For example, a timing gap between Uu link and SL may include at least one of a difference value between the start time when DL SFN is 0 and the start time when SL DFN is 0, a difference value between the start time of a DL subframe and the start time of an SL subframe, or a difference value between the start time of a DL slot and the start time of an SL slot. For example, a timing gap between Uu link and SL may include a difference value between a timing gap between the DL timing and the SL timing previously transmitted by a transmitting UE to a base station and a time gap between the DL timing and the SL timing currently measured by the transmitting UE. For example, a timing gap between Uu link and SL may include a timing offset value between a PSFCH and a PUCCH equal to or greater than a PUCCH processing time required for a transmitting UE. For example, a timing gap between Uu link and SL may include a timing offset value for between a time point in which a transmitting UE receives a PSFCH from a receiving UE and a time point in which the transmitting UE transmits a HARQ feedback to a base station through a PUCCH, which is greater than or equal to a processing time required for the transmitting UE. For example, a timing gap between Uu link and SL may include a difference value of a timing offset value between a PFSCH and a PUCCH, configured by a base station and a timing offset value between a PSFCH and a PUCCH, which is equal to or greater than a PUCCH processing time required for a transmitting UE.

On the other hand, despite a transmitting UE transmitting a timing gap between Uu link and SL to a base station, a processing time required for the transmitting UE may not be guaranteed. Various embodiments of the present disclosure below may be combined with each other.

According to an embodiment of the present disclosure, although a transmitting UE transmits a timing gap between Uu link and SL to a base station, if a processing time required for the transmitting UE is not guaranteed, and if the base station does not receive a HARQ feedback through a PUCCH resource allocated to the transmitting UE, the base station may consider a DL discontinuous transmission (DTX) or UL negative acknowledgment (NACK) situation and reallocate a PUCCH resource to the transmitting UE. For example, if a base station does not receive a HARQ feedback through a PUCCH resource allocated to a transmitting UE, the base station may consider the SL DTX situation, and allocate SL retransmission to the transmitting UE in order to reduce the latency of SL transmission, and may allocate a PUCCH resource for receiving HARQ feedback for the SL retransmission to the transmitting UE.

For example, the operation of the above-described embodiment may be performed based on a predefined or pre-configured number/timer configured from a base station/network. For example, when the operation is performed for the number of times/timer, a transmitting UE may stop an attempt to transmit a HARQ feedback related to the SL transmission to a base station.

According to an embodiment of the present disclosure, even though a transmitting UE transmits a timing gap between Uu link and SL to a base station, if the processing time required for the transmitting UE is not guaranteed, when the transmitting UE attempts to transmit an ACK through a PUCCH, the transmitting UE may drop the PUCCH transmission. For example, after a transmitting UE drops the PUCCH transmission, the transmitting UE may not receive additional sidelink retransmission resources from the base station by transmitting the HARQ ACK back to the base station through the PUCCH resource reallocated from the base station.

For example, after a transmitting UE drops a PUCCH transmission, the transmitting UE may transmit a HARQ ACK to a base station through a PUCCH related to an SL retransmission resource additionally allocated from the base station, the transmitting UE may release the allocated SL retransmission resource.

For example, after a transmitting UE drops a PUCCH transmission, the transmitting UE may transmit a HARQ ACK to a base station through a PUCCH related to an SL retransmission resource additionally allocated from the base station, the transmitting UE may use the allocated SL retransmission resource as an initial transmission or retransmission resource for another transport block.

For example, after a transmitting UE drops a PUCCH transmission, additional PUCCH resources from a base station may not be allocated to the transmitting UE, or the latency required for the UE to transmit HARQ feedback to the base station through a PUCCH may be requested to be shorter than a specific time. In this case, a transmitting UE may piggyback and transmit an HARQ ACK to another PUCCH transmission existing at the earliest point in time after dropping the PUCCH transmission, the transmitting UE may not be allocated additional retransmission resources from the base station.

For example, after a transmitting UE drops a PUCCH transmission, among fallback PUCCH resources, HARQ ACK may be transmitted to a base station through a fallback PUCCH resource which exists at the earliest point after the PUCCH transmission is dropped, the transmitting UE may not be allocated additional retransmission resources from the base station. In this case, for example, a transmitting UE may transmit to a base station a HARQ process number (HPN) linked to a transport block which is a target of the HARQ ACK along with the HARQ ACK to the base station through the PUCCH resource. For example, a fallback PUCCH resource may be predefined or pre-configured or configured from a base station/network. For example, a fallback PUCCH resource may be a default PUCCH resource.

For example, the operation of the above-described embodiment may be performed based on a predefined or pre-configured number/timer configured from a base station/network. For example, when the operation is performed for the number of times/timer, the transmitting UE may stop an attempt to transmit an HARQ feedback related to the SL transmission to a base station.

According to an embodiment of the present disclosure, even though a transmitting UE transmits a timing gap between Uu link and SL to a base station, if a processing time required for the transmitting UE is not guaranteed, when the transmitting UE attempts to transmit a NACK through a PUCCH, the transmitting UE may drop the PUCCH transmission.

Even though a transmitting UE transmits a timing gap between Uu link and SL to a base station, if a processing time required for the transmitting UE is not guaranteed, for example, after a transmitting UE drops a PUCCH transmission, the transmitting UE may additionally receive a (allocated) sidelink retransmission resource from a base station by transmitting an HARQ NACK back to the base station through a PUCCH resource reallocated from the base station.

For example, after a transmitting UE drops a PUCCH transmission, the transmitting UE may perform sidelink retransmission based on an SL retransmission resource additionally allocated from a base station, the dropped HARQ NACK may be replaced with an HARQ feedback related to the sidelink retransmission transmitted to the base station.

For example, after a transmitting UE drops a PUCCH transmission, additional PUCCH resources from a base station may not be allocated to the transmitting UE, or the latency required for the UE to transmit HARQ feedback to the base station through a PUCCH may be requested to be shorter than a specific time. In this case, the transmitting UE may piggyback and transmit an HARQ NACK to another PUCCH transmission existing at the earliest time point after dropping the PUCCH transmission, the transmitting UE may be allocated additional retransmission resource from the base station.

For example, after a transmitting UE drops a PUCCH transmission, an HARQ NACK may be transmitted to a base station through a fallback PUCCH resource existing at the earliest point in time after dropping the PUCCH transmission among the fallback PUCCH resources, the transmitting UE may be allocated additional retransmission resource from the base station. In this case, for example, a transmitting UE may transmit to a base station a HARQ process number (HPN) linked to a transport block which is a target of an HARQ NACK along with the HARQ ACK to the base station through the PUCCH resource. For example, a fallback PUCCH resource may be predefined or pre-configured or configured from a base station/network. For example, a fallback PUCCH resource may be a default PUCCH resource.

For example, the operation of the above-described embodiment may be performed based on a predefined or pre-configured number/timer configured from a base station/network. For example, when the operation is performed for the number of times/timer, the transmitting UE may stop an attempt to transmit an HARQ feedback related to the SL transmission to a base station.

According to an embodiment of the present disclosure, even though a transmitting UE transmits a timing gap between Uu link and SL to a base station, if a processing time required for the transmitting UE is not guaranteed, a transmitting UE may drop a transport block related to data transmitted to a receiving UE.

For example, after a transmitting UE drops a PUCCH transmission, the transmitting UE may not receive additional sidelink retransmission resources from a base station by transmitting a HARQ ACK back to a base station through a PUCCH resource reallocated from the base station.

For example, after a transmitting UE drops a transport block the transmitting UE may transmit a HARQ ACK to a base station through a PUCCH related to an SL retransmission resource additionally allocated from the base station, the transmitting UE may release the allocated SL retransmission resource.

For example, after a transmitting UE drops a transport block the transmitting UE may transmit a HARQ ACK to a base station through a PUCCH related to an SL retransmission resource additionally allocated from the base station, the transmitting UE may use the allocated SL retransmission resource as an initial transmission or retransmission resource for another transport block.

For example, after a transmitting UE drops a transport block additional PUCCH resources from a base station may not be allocated to the transmitting UE, or the latency required for the UE to transmit HARQ feedback to the base station through a PUCCH may be requested to be shorter than a specific time. In this case, a transmitting UE may piggyback and transmit an HARQ ACK to another PUCCH transmission existing at the earliest point in time after dropping the PUCCH transmission, the transmitting UE may not be allocated additional retransmission resources from the base station.

For example, after a transmitting UE drops a transport block among fallback PUCCH resources, HARQ ACK may be transmitted to a base station through a fallback PUCCH resource which exists at the earliest point after the PUCCH transmission is dropped, the transmitting UE may not be allocated additional retransmission resources from the base station. In this case, for example, a transmitting UE may transmit to a base station a HARQ process number (HPN) linked to a transport block which is a target of the HARQ ACK along with the HARQ ACK to the base station through the PUCCH resource. For example, a fallback PUCCH resource may be predefined or pre-configured or configured from a base station/network. For example, a fallback PUCCH resource may be a default PUCCH resource.

For example, the operation of the above-described embodiment may be performed based on a predefined or pre-configured number/timer configured from a base station/network. For example, when the operation is performed for the number of times/timer, a transmitting UE may stop an attempt to transmit an HARQ feedback related to an SL transmission to a base station.

According to an embodiment of the present disclosure, even though a transmitting UE transmits a timing gap between Uu link and SL to a base station, if a processing time required for the transmitting UE is not guaranteed, the transmitting UE may transmit a timing gap between Uu link and SL back to the base station. For example, a retransmitted timing gap between Uu link and SL may be the same as the first transmitted timing gap between Uu link and SL. For example, a retransmitted timing gap between Uu link and SL may be a timing gap between Uu link and SL measured/acquired at the current time point. For example, the retransmitted timing gap between Uu link and SL may be a value obtained by multiplying the initially transmitted timing gap between Uu link and SL by a scaling value. For example, a scaling value may be a predefined or pre-configured or configured value from a base station/network. For example, a retransmitted timing gap between Uu link and SL may be transmitted by adding a delta value to the first transmitted timing gap between Uu link and SL. For example, a delta value may be a predefined or pre-configured or configured value from a base station/network. For example, a retransmitted timing gap between Uu link and SL may be a delta value, and a base station may use the previously transmitted timing gap between Uu link and SL based on the delta value. For example, the retransmitted timing gap between Uu link and SL may be a predefined or pre-configured or configured timing gap value from a base station/network.

According to an embodiment of the present disclosure, even though a transmitting UE transmits a timing gap between Uu link and SL to a base station, if a processing time required for the transmitting UE is not guaranteed, the UE may give up HARQ feedback-based retransmission and perform blind retransmission.

For example, a transmitting UE may perform blind retransmission by using remaining CG resources after successful transmission of the next transport block among CG resources of the next period. For example, a transmitting UE may perform blind retransmission by using remaining DG resources after successful transmission of another transport block. For example, a transmitting UE may transmit an HPN of a transport block in which blind retransmission is performed together with the blind retransmission.

According to an embodiment of the present disclosure, even though a transmitting UE transmits a timing gap between Uu link and SL to a base station, if a processing time required for the transmitting UE is not guaranteed, the UE may give up HARQ feedback-based retransmission and transmit a transport block through sidelink mode-2 transmission.

For example, a transmitting UE may transmit a transport block by using a transmission resource that satisfies a packet delay budget among available sidelink mode-2 transmission resources. For example, when there is no transmission resource that satisfies a packet delay budget among available transmission resources of sidelink mode-2, a transmission UE may drop a transport block. For example, when there is no transmission resource that satisfies a packet delay budget among available transmission resources of sidelink mode-2, a transmitting UE may perform the operations of various embodiments of the present disclosure described above.

For example, when sidelink mode-1 and sidelink mode-2 coexist, the transmitting UE may not receive additional sidelink retransmission resources from a base station by transmitting a HARQ ACK back to a base station through a PUCCH resource reallocated from the base station.

For example, when sidelink mode-1 and sidelink mode-2 coexist, the transmitting UE may transmit a HARQ ACK to a base station through a PUCCH related to an SL retransmission resource additionally allocated from the base station, the transmitting UE may release the allocated SL retransmission resource.

For example, when sidelink mode-1 and sidelink mode-2 coexist, the transmitting UE may transmit a HARQ ACK to a base station through a PUCCH related to an SL retransmission resource additionally allocated from the base station, the transmitting UE may use the allocated SL retransmission resource as an initial transmission or retransmission resource for another transport block.

For example, when sidelink mode-1 and sidelink mode-2 coexist, additional PUCCH resources from a base station may not be allocated to the transmitting UE, or the latency required for the UE to transmit HARQ feedback to the base station through a PUCCH may be requested to be shorter than a specific time. In this case, a transmitting UE may piggyback and transmit an HARQ ACK to another PUCCH transmission existing at the earliest point in time after dropping the PUCCH transmission, the transmitting UE may not be allocated additional retransmission resources from the base station.

For example, when sidelink mode-1 and sidelink mode-2 coexist, among fallback PUCCH resources, HARQ ACK may be transmitted to a base station through a fallback PUCCH resource which exists at the earliest point after the PUCCH transmission is dropped, the transmitting UE may not be allocated additional retransmission resources from the base station. In this case, for example, a transmitting UE may transmit to a base station a HARQ process number (HPN) linked to a transport block which is a target of the HARQ ACK along with the HARQ ACK to the base station through the PUCCH resource. For example, a fallback PUCCH resource may be predefined or pre-configured or configured from a base station/network. For example, a fallback PUCCH resource may be a default PUCCH resource.

According to an embodiment of the present disclosure, when an HARQ feedback transmission through a PUCCH from a transmitting UE is not reported more than a certain number of times, a base station may determine that the transmitting UE cannot perform HARQ feedback transmission to the base station because a PUCCH processing time is insufficient. In this case, a base station may not allocate any more PUCCH resources to a transmitting UE unless the transmitting UE additionally requests a resource.

According to an embodiment of the present disclosure, a transmitting UE may transmit a timing gap between Uu link and SL to a base station through MAC CE or RRC. Or, for example, when a transmitting UE reports an HARQ feedback to a base station through a PUCCH by satisfying a PUCCH processing time, and if a timing gap between Uu link and SL is greater than or equal to a threshold value, it may be determined that a PUCCH processing time cannot be guaranteed in the future. In this case, for example, a transmitting UE may transmit a timing gap between Uu link and SL to a base station by piggybacking the timing gap between Uu link and SL in the currently transmitted PUCCH or multiplexing with the HARQ feedback transmission.

According to the present disclosure, if a PUCCH timing configured by a base station is shorter than a PUCCH processing time required by a transmitting UE, so that HARQ feedback cannot be transmitted at the PUCCH timing even though the transmitting UE transmits a timing gap between an SFN and a DFN to the base station, the transmitting UE may perform sidelink communication efficiently.

Figure 10:
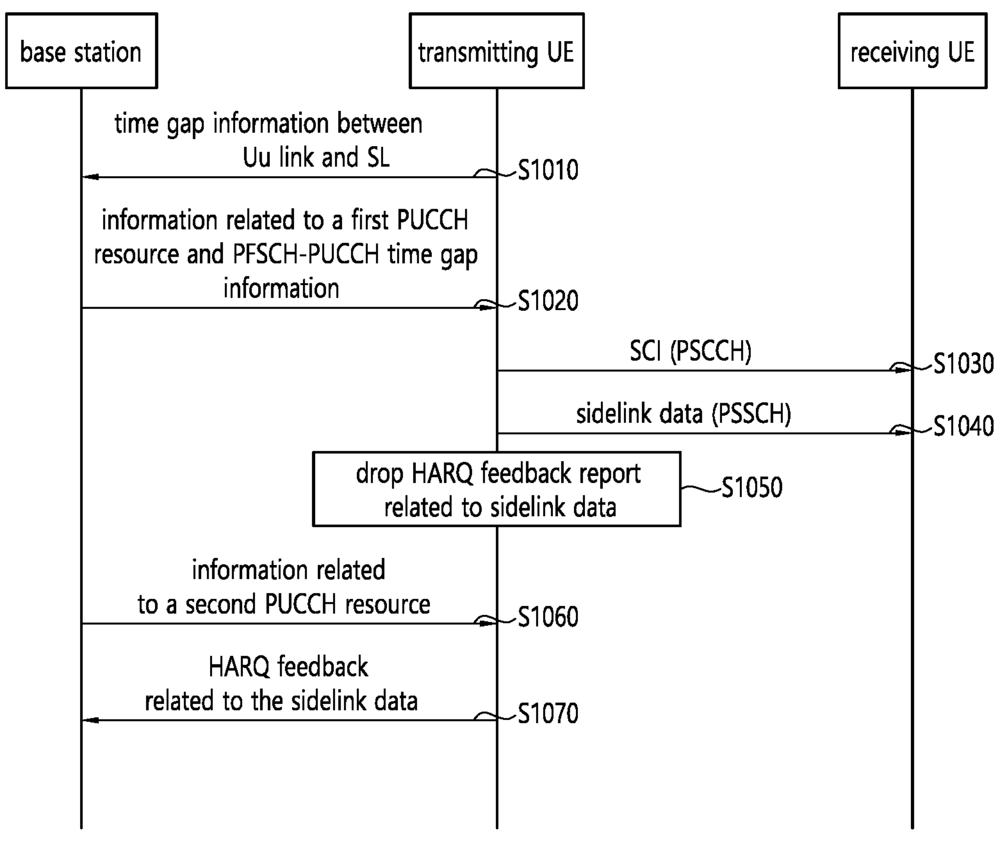
FIG. 10 shows a procedure for a transmitting UE to drop an HARQ feedback report related to sidelink data according to an embodiment of the present disclosure.
Figure 11:
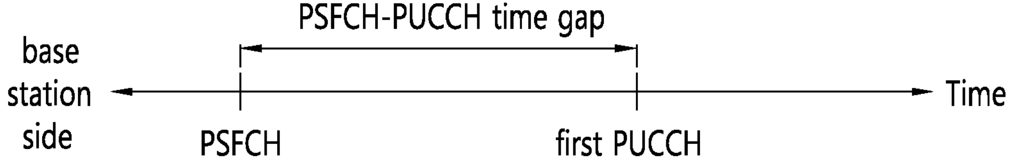
FIG. 11 is an example of dropping an HARQ feedback report related to sidelink data based on a processing time of a UE according to an embodiment of the present disclosure.
Figure 11:
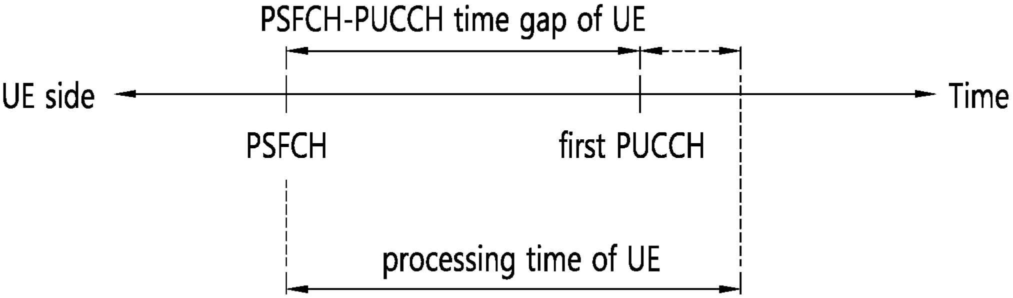

FIG. 10 shows a procedure for a transmitting UE to drop an HARQ feedback report related to sidelink data according to an embodiment of the present disclosure. FIG. 11 is an example of dropping an HARQ feedback report related to sidelink data based on a processing time of a UE according to an embodiment of the present disclosure. The embodiments of FIG. 10 and FIG. 11 may be combined with various embodiments of the present disclosure.

Referring to FIG. 10, in step S1010, a transmitting UE may transmit information related to a time gap between Uu link and sidelink to a base station. For example, a transmitting UE may transmit information related to a time gap between Uu link and sidelink to a base station at every pre-configured period. For example, a transmitting UE may transmit information related to a time gap between Uu link and sidelink to a base station, based on the difference between a time gap between a system frame number (SFN) and a direct frame number (DFN) being greater than or equal to a pre-configured threshold. For example, a transmitting UE may transmit information related to a time gap between Uu link and sidelink to a base station based on a synchronization reference source for sidelink communication being changed For example, a time gap between Uu link and sidelink may be one of a difference value between the time when SFN is 0 and the time when DFN is 0, a difference value between the start time of a downlink subframe and the start time of a sidelink subframe, or a difference value between the start time of a downlink slot and the start time of a sidelink slot. For example, information related to a time gap between Uu link and sidelink may include a difference value between a time gap between Uu link and sidelink previously transmitted to a base station and a time gap between Uu link and sidelink currently measured by a transmitting UE. For example, information related to a time gap between Uu link and sidelink may include a time offset value between a PSFCH and a PUCCH equal to or greater than the time required for a transmitting UE to process a first PUCCH. For example, information related to a time gap between Uu link and sidelink may include a difference value between a time offset between a PSFCH and a PUCCH configured by a base station and a time offset between a PSFCH and a PUCCH greater than or equal to the time required for a transmitting UE to process a first PUCCH.

In step S1020, a base station may transmit information related to a first PUCCH resource and information related to a time gap between a PSFCH and a PUCCH to a transmitting UE. For example, the information related to the time gap between a PSFCH and a PUCCH may be determined based on information related to a time gap between Uu link and sidelink. For example, a base station may configure the information related to the time gap between a PSFCH and a PUCCH based on the information related to the time gap between Uu link and sidelink.

In step S1030, a transmitting UE may transmit SCI to a receiving UE through a PSCCH. In step S1040, a transmitting UE may transmit sidelink data to a receiving UE through a PSSCH related to a PSCCH.

In step S1050, a transmitting UE may drop transmission of HARQ feedback related to sidelink data on a first PUCCH resource, based on a time gap between the first PUCCH resource and a PSFCH resource being smaller than the time gap between a PUCCH and a PSFCH. For example, a PSFCH resource may be determined based on an index of a subchannel and an index of a slot related to a PSSCH.

Specifically, referring to FIG. 11, when the timing (e.g., SFN) used by a base station and the timing (e.g., DFN) used by a UE are different from each other, a PSFCH time of a base station side and a PSFCH time of a UE side may be different from each other. For example, if a processing time required for a transmitting UE exceeds a time gap between a PSFCH and a PUCCH received from a base station, the transmitting UE may drop transmission of HARQ feedback related to sidelink data on a first PUCCH resource. That is, for example, when the time gap between a PSFCH and a first PUCCH in perspective of a transmitting UE is smaller than a time gap between a PSFCH and a first PUCCH configured by a base station, the UE may drop a transmission of a first PUCCH. For example, a processing time of a UE may be a time required for the UE to report HARQ feedback related to sidelink data to a base station through a PUCCH. For example, a processing time of a UE may be referred to as a first PUCCH processing time of a UE. For example, a time gap between a PSFCH and a PUCCH may be a value configured by a base station.

In step S1060, a base station may transmit information related to a second PUCCH resource to a transmitting UE based on a transmission of a HARQ feedback related to sidelink data on a first PUCCH resource being dropped. For example, a second PUCCH resource may be a default PUCCH resource present at the earliest point among a plurality of pre-configured PUCCH resources after a transmission of HARQ feedback related to sidelink data on a first PUCCH resource is dropped.

In step S1070, a transmitting UE may transmit an ACK related to sidelink data to a base station based on a second PUCCH resource. For example, based on a base station receiving an ACK related to sidelink data, a sidelink transmission resource for retransmitting the sidelink data may not be allocated to a transmitting UE. For example, a HARQ process number (HPN) related to sidelink data along with an ACK related to the sidelink data may be transmitted by a transmitting UE to a base station. For example, the HPN may be multiplexed with an ACK related to sidelink data or may be piggybacked on a second PUCCH resource.

Additionally, for example, a transmitting UE may transmit sidelink data to a receiving UE through a resource selected by the transmitting UE based on not performing HARQ feedback-based retransmission related to the sidelink data. For example, a transmitting UE may transmit indication information for releasing at least one of a PSCCH resource, a PSSCH resource, a PSFCH resource, or a PUCCH resource allocated to the transmitting UE by a base station.

For example, in sidelink mode-1 operation, when a base station allocates a CG resource to a transmitting UE, the base station may allocate a periodic PUCCH resource to the transmitting UE. In this case, as in the above-described embodiment, when a transmitting UE cannot use a first PUCCH resource due to the insufficient PUCCH-related processing time of the transmitting UE, the transmitting UE may release periodic PUCCH resources. For example, a transmitting UE may transmit indication information for releasing periodic PUCCH resources related to a first PUCCH resource to a base station. Here, for example, the indication information may be transmitted through a third PUCCH resource at a position after and the closest to the first PUCCH resource.

Figure 12:
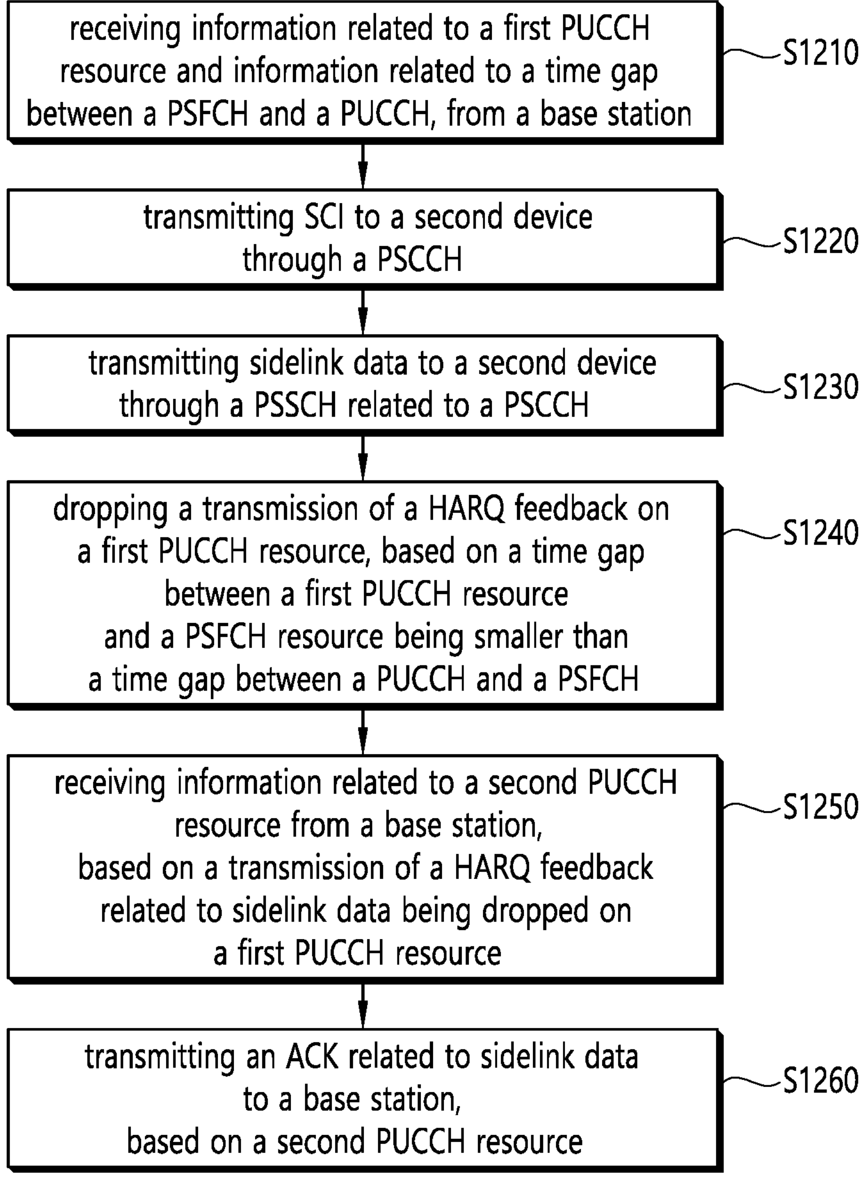
FIG. 12 shows a method for a first device to perform sidelink transmission based on a PUCCH processing time, according to an embodiment of the present disclosure.

FIG. 12 shows a method for a first device to perform sidelink transmission based on a PUCCH processing time, according to an embodiment of the present disclosure. The embodiment of FIG. 12 may be combined with various embodiments of the present disclosure.

Referring to FIG. 12, in step S1210, a first device 100 may receive information related to a first physical uplink control channel (PUCCH) resource and information related to a time gap between a physical sidelink feedback channel (PSFCH) and a PUCCH from a base station. For example, a first device 100 may transmit information related to a time gap between Uu link and sidelink to the base station. For example, a first device 100 may transmit information related to a time gap between Uu link and sidelink to the base station every pre-configured period. For example, a first device 100 may transmit information related to a time gap between Uu link and sidelink to the base station based on a difference of a time gap of a system frame number (SFN) and a direct frame number (DFN) being equal to or greater than a pre-configured threshold value. For example, a first device 100 may transmit information related to a time gap between Uu link and sidelink to the base station based on a synchronization reference source for sidelink communication being changed.

For example, a time gap between Uu link and sidelink may be one of a difference value of a time point in which an SFN is 0 and a time point in which a DFN is 0, a difference value of a start time point of a downlink subframe and a start time point of a sidelink subframe, or a difference value of a start time point of a downlink slot and a start time point of a sidelink slot. For example, information related to a time gap between Uu link and sidelink may include a difference value, between a time gap between Uu link transmitted to a base station before and sidelink and a time gap between Uu link currently measured by the first device 100 and sidelink. For example, information related to a time gap between Uu link and sidelink may include a time offset value between a PSFCH and a PUCCH, greater than or equal to a time required for a first device 100 to process a first PUCCH. For example, information related to a time gap between Uu link and sidelink may include a difference value, between a time offset between a PSFCH configured by a base station and a PUCCH and a time offset between a PSFCH and a PUCCH, greater than or equal to a time required for a first device 100 to process a first PUCCH.

For example, the information related to the time gap between a PSFCH and a PUCCH is determined based on the information related to a time gap between Uu link and sidelink. For example, a base station may configure information related to the time gap between a PSFCH and a PUCCH based on the information related to the time gap between Uu link and sidelink.

In step S1220, a first device 100 may transmit sidelink control information (SCI) to a second device 200 through a physical sidelink control channel (PSCCH). In step S1230, a first device 100 may transmit sidelink data, to a second device 200, through a physical sidelink shared channel (PSSCH) related to the PSCCH.

In step S1240, a first device may determine a PSFCH resource, based on an index of a subchannel related to a PSSCH and an index of a slot, wherein the first device 100 may drop a transmission of a hybrid automatic repeat request (HARQ) feedback related to sidelink data on a first PUCCH resource, based on a time gap between a PSFCH resource and a first PUCCH resource being smaller than the time gap between a PSFCH and a PUCCH.

In step S1250, a first device 100 may receive information related to a second PUCCH resource, from a base station, based on a transmission of a HARQ feedback related to sidelink data being dropped. For example, a second PUCCH resource may be a default PUCCH resource present at the earliest point after a transmission of HARQ feedback related to sidelink data on a first PUCCH resource is dropped, among a plurality of pre-configured default PUCCH resources.

In step S1260, a first device 100 may transmit an acknowledgement (ACK) related to sidelink data to a base station, based on a second PUCCH resource. For example, based on a base station receiving an ACK related to sidelink data, a sidelink transmission resource for retransmitting the sidelink data may not be allocated to a first device 100. For example, a HARQ process number (HPN) related to sidelink data may be transmitted together with an ACK related to the sidelink data, by a first device 100 to a base station. For example, the HPN may be multiplexed with an ACK related to sidelink data, or may be piggybacked on a second PUCCH resource.

For example, a first device 100 may transmit sidelink data, to a second device 200, through a resource selected by the first device 100, based on not performing a retransmission based on a HARQ feedback related to the sidelink data. For example, a first device 100 may transmit indication information for releasing at least one of a PSCCH resource, a PSSCH resource, a PSFCH resource or a PUCCH resource, allocated to the first device 100 by a base station.

For example, in sidelink mode-1 operation, when a base station allocates a CG resource to a first device 100, the base station may allocate a periodic PUCCH resource to the first device 100. For example, when a first device 100 cannot use a first PUCCH resource due to the lack of PUCCH related processing time of the first device 100, the first device 100 may release periodic PUCCH resources. For example, a first device 100 may transmit indication information for releasing a periodic PUCCH resource related to a first PUCCH resource to a base station. Here, for example, the indication information may be transmitted through a third PUCCH resource of a nearest position after the first PUCCH resource.

The above-described embodiment can be applied to various devices to be described below. For example, a processor 102 of a first device 100 may control a transceiver 106 to receive information related to a first physical uplink control channel (PUCCH) resource and information related to a time gap between a physical sidelink feedback channel (PSFCH) and a PUCCH from a base station. And, a processor 102 of a first device 100 may control a transceiver 106 to transmit sidelink control information (SCI) to a second device 200 through a physical sidelink control channel (PSCCH). And, a processor 102 of a first device 100 may control a transceiver 106 to transmit sidelink data, to the second device 200, through a physical sidelink shared channel (PSSCH) related to the PSCCH. And, a processor 102 of a first device 100 may determine a PSFCH resource, based on an index of a subchannel related to the PSSCH and an index of a slot, wherein the first device may control a transceiver 106 to drop a transmission of a hybrid automatic repeat request (HARQ) feedback related to the sidelink data on the first PUCCH resource, based on a time gap between the determined PSFCH resource and the first PUCCH resource being smaller than the time gap between a PSFCH and a PUCCH. And, a processor 102 of a first device 100 may control a transceiver 106 to receive information related to a second PUCCH resource, from the base station, based on the transmission of the HARQ feedback being dropped. And, a processor 102 of a first device 100 may control a transceiver 106 to transmit an acknowledgement (ACK) related to the sidelink data to the base station, based on the second PUCCH resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers, wherein the one or more processors execute the instructions to: receive information related to a first physical uplink control channel (PUCCH) resource and information related to a time gap between a physical sidelink feedback channel (PSFCH) and a PUCCH from a base station; transmit sidelink control information (SCI) to a second device through a physical sidelink control channel (PSCCH); transmit sidelink data, to the second device, through a physical sidelink shared channel (PSSCH) related to the PSCCH; determine a PSFCH resource, based on an index of a subchannel related to the PSSCH and an index of a slot, wherein the first device may drop a transmission of a hybrid automatic repeat request (HARQ) feedback related to the sidelink data on the first PUCCH resource, based on a time gap between the determined PSFCH resource and the first PUCCH resource being smaller than the time gap between a PSFCH and a PUCCH; receive information related to a second PUCCH resource, from the base station, based on the transmission of the HARQ feedback being dropped; and transmit an acknowledgement (ACK) related to the sidelink data to the base station, based on the second PUCCH resource.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: receive information related to a first physical uplink control channel (PUCCH) resource and information related to a time gap between a physical sidelink feedback channel (PSFCH) and a PUCCH from a base station; transmit sidelink control information (SCI) to a second UE through a physical sidelink control channel (PSCCH); transmit sidelink data, to the second UE, through a physical sidelink shared channel (PSSCH) related to the PSCCH; determine a PSFCH resource, based on an index of a subchannel related to the PSSCH and an index of a slot, wherein the first UE may drop a transmission of a hybrid automatic repeat request (HARQ) feedback related to the sidelink data on the first PUCCH resource, based on a time gap between the determined PSFCH resource and the first PUCCH resource being smaller than the time gap between a PSFCH and a PUCCH; receive information related to a second PUCCH resource, from the base station, based on the transmission of the HARQ feedback being dropped; and transmit an acknowledgement (ACK) related to the sidelink data to the base station, based on the second PUCCH resource.

According to an embodiment of the present disclosure, a non-transitory computer-readable storage medium storing instructions may be proposed. For example, the instructions, when executed, may cause a first device to: receive information related to a first physical uplink control channel (PUCCH) resource and information related to a time gap between a physical sidelink feedback channel (PSFCH) and a PUCCH from a base station; transmit sidelink control information (SCI) to a second device through a physical sidelink control channel (PSCCH); transmit sidelink data, to the second device, through a physical sidelink shared channel (PSSCH) related to the PSCCH; determine a PSFCH resource, based on an index of a subchannel related to the PSSCH and an index of a slot, wherein the first device may drop a transmission of a hybrid automatic repeat request (HARQ) feedback related to the sidelink data on the first PUCCH resource, based on a time gap between the determined PSFCH resource and the first PUCCH resource being smaller than the time gap between a PSFCH and a PUCCH; receive information related to a second PUCCH resource, from the base station, based on the transmission of the HARQ feedback being dropped; and transmit an acknowledgement (ACK) related to the sidelink data to the base station, based on the second PUCCH resource.

Figure 13:
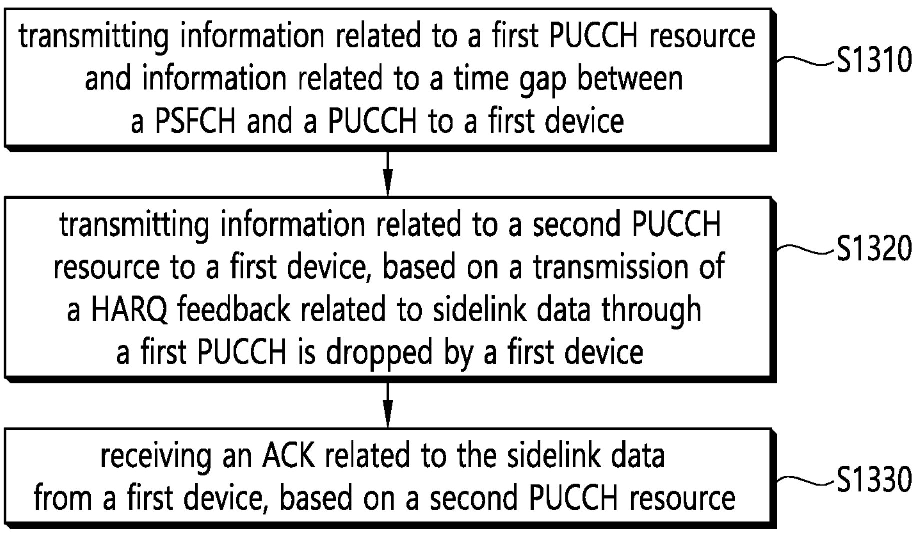
FIG. 13 shows a method for a base station to receive information related to HARQ feedback from a first device based on a time gap between a PSFCH and a PUCCH, according to an embodiment of the present disclosure.

FIG. 13 shows a method for a base station to receive information related to HARQ feedback from a first device based on a time gap between a PSFCH and a PUCCH, according to an embodiment of the present disclosure. The embodiment of FIG. 13 may be combined with various embodiments of the present disclosure.

Referring to FIG. 13, in step S1310, a base station may transmit information related to a first physical uplink control channel (PUCCH) resource and information related to a time gap between a physical sidelink feedback channel (PSFCH) and a PUCCH to a first device 100. For example, wherein sidelink data is transmitted by a first device 100. For example, sidelink data may be transmitted from a first device 100 to a second device 200 through a PSSCH. For example, a PSFCH resource may be determined based on an index of a subchannel and an index of a slot related to the PSSCH.

For example, a base station may receive, from a first device 100, information related to a time gap between Uu link and sidelink. For example, a base station may receive information related to a time gap between Uu link and sidelink from a first device 100 every pre-configured period. For example, a base station may receive information related to a time gap between Uu link and sidelink from a first device 100 based on a difference of a time gap of a system frame number (SFN) and a direct frame number (DFN) being equal to or greater than a pre-configured threshold value. For example, a base station may receive information related to a time gap between Uu link and sidelink from a first device 100 based on a synchronization reference source for sidelink communication being changed.

For example, a time gap between Uu link and sidelink may be one of a difference value of a time point in which an SFN is 0 and a time point in which a DFN is 0, a difference value of a start time point of a downlink subframe and a start time point of a sidelink subframe, or a difference value of a start time point of a downlink slot and a start time point of a sidelink slot. For example, information related to a time gap between Uu link and sidelink may include a difference value, between a time gap between Uu link transmitted to a base station before and sidelink and a time gap between Uu link currently measured by the first device 100 and sidelink. For example, information related to a time gap between Uu link and sidelink may include a time offset value between a PSFCH and a PUCCH, greater than or equal to a time required for a first device 100 to process a first PUCCH. For example, information related to a time gap between Uu link and sidelink may include a difference value, between a time offset between a PSFCH configured by a base station and a PUCCH and a time offset between a PSFCH and a PUCCH, greater than or equal to a time required for a first device 100 to process a first PUCCH.

For example, the information related to the time gap between a PSFCH and a PUCCH is determined based on the information related to a time gap between Uu link and sidelink. For example, a base station may configure information related to the time gap between a PSFCH and a PUCCH based on the information related to the time gap between Uu link and sidelink.

In step S1320, a base station may transmit information related to a second PUCCH resource to a first device 100, based on a transmission of a hybrid automatic repeat request (HARQ) feedback related to sidelink data through a first PUCCH being dropped by the first device. For example, a transmission of a HARQ feedback related to sidelink data may be dropped on a first PUCCH resource by a first device 100, based on a time gap between the first PUCCH resource and a PSFCH resource related to the sidelink data being smaller than the time gap between a PSFCH and a PUCCH. For example, a second PUCCH resource may be a default PUCCH resource present at the earliest point after a transmission of HARQ feedback related to sidelink data on a first PUCCH resource is dropped among a plurality of pre-configured default PUCCH resources.

In step S1330, a base station may receive an acknowledgement (ACK) related to the sidelink data from a first device 100, based on a second PUCCH resource.

For example, a base station may not allocate a sidelink transmission resource for retransmitting sidelink data to a first device 100 based on receiving an ACK related to the sidelink data. For example, a base station may receive from a first device 100 a HARQ process number (HPN) related to sidelink data together with an ACK related to the sidelink data. For example, the HPN may be multiplexed with an ACK related to sidelink data or may be piggybacked on a second PUCCH resource.

The above-described embodiment can be applied to various devices to be described below. For example, a processor of a base station may control a transceiver to transmit information related to a first PUCCH resource and information related to a time gap between a PSFCH and a PUCCH to a first device 100. And, a processor of a base station may control a transceiver to transmit information related to a second PUCCH resource to a first device 100, based on a transmission of a HARQ feedback related to sidelink data through a first PUCCH being dropped by a first device 100. And, a processor of a base station may control a transceiver to receive an ACK related to sidelink data from a first device 100 based on a second PUCCH resource.

According to an embodiment of the present disclosure, a base station for performing wireless communication may be proposed. For example, a base station may comprise: one or more memories storing instructions; one or more transceivers; and one or more processors connected to the one or more memories and the one or more transceivers. For example, the one or more processors may execute the instructions to: transmit information related to a first physical uplink control channel (PUCCH) resource and information related to a time gap between a physical sidelink feedback channel (PSFCH) and a PUCCH to a first device, wherein sidelink data is transmitted by the first device; transmit information related to a second PUCCH resource to the first device, based on a transmission of a hybrid automatic repeat request (HARQ) feedback related to the sidelink data through the first PUCCH being dropped by the first device; and receive an acknowledgement (ACK) related to the sidelink data from the first device, based on the second PUCCH resource. For example, a transmission of a HARQ feedback related to the sidelink data is dropped on the first PUCCH resource by the first device, based on a time gap between the first PUCCH resource and a PSFCH resource related to the sidelink data being smaller than the time gap between a PSFCH and a PUCCH.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
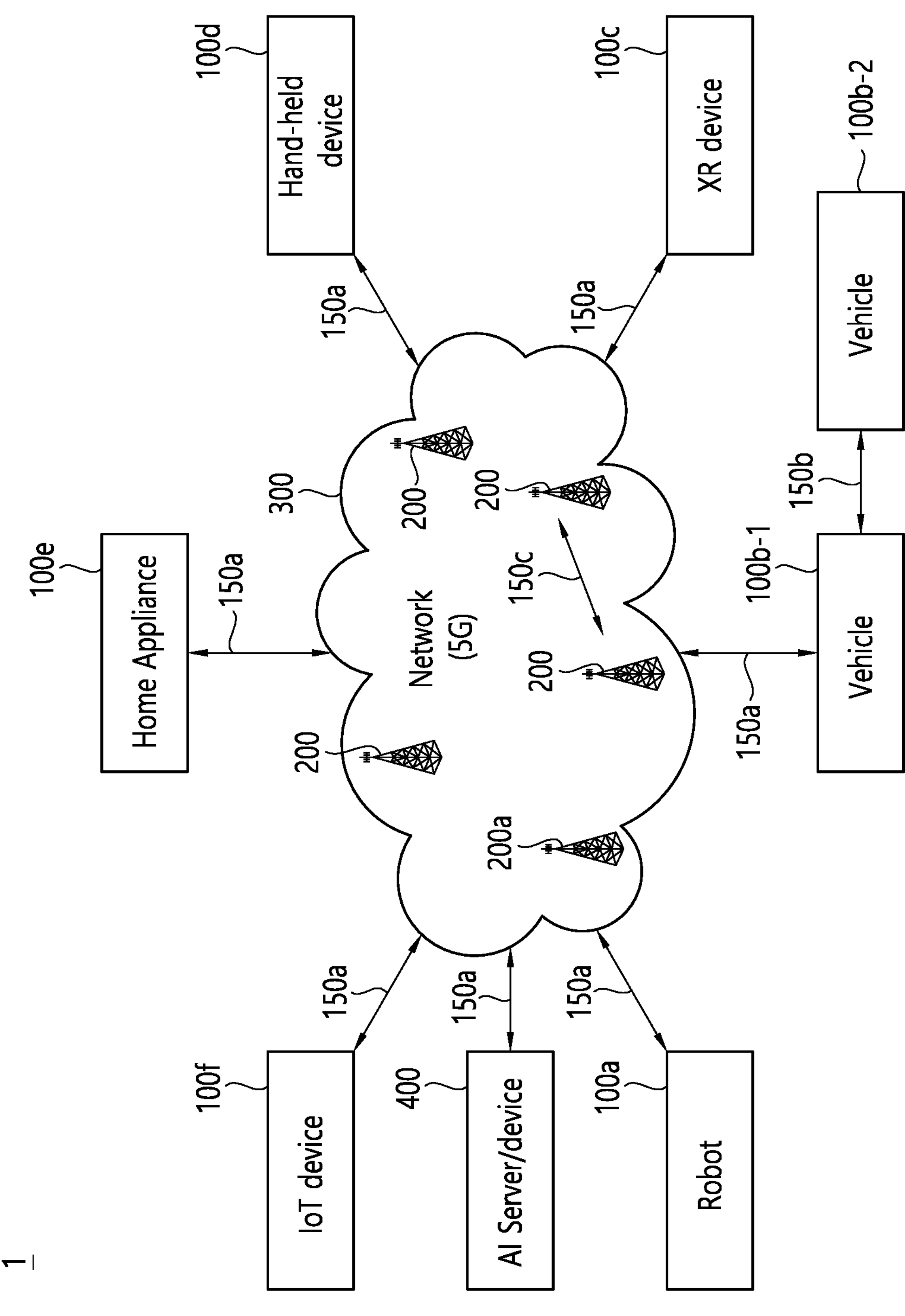
FIG. 14 shows a communication system 1, based on an embodiment of the present disclosure.

FIG. 14 shows a communication system 1, based on an embodiment of the present disclosure. The embodiment of FIG. 14 may be combined with various embodiments of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
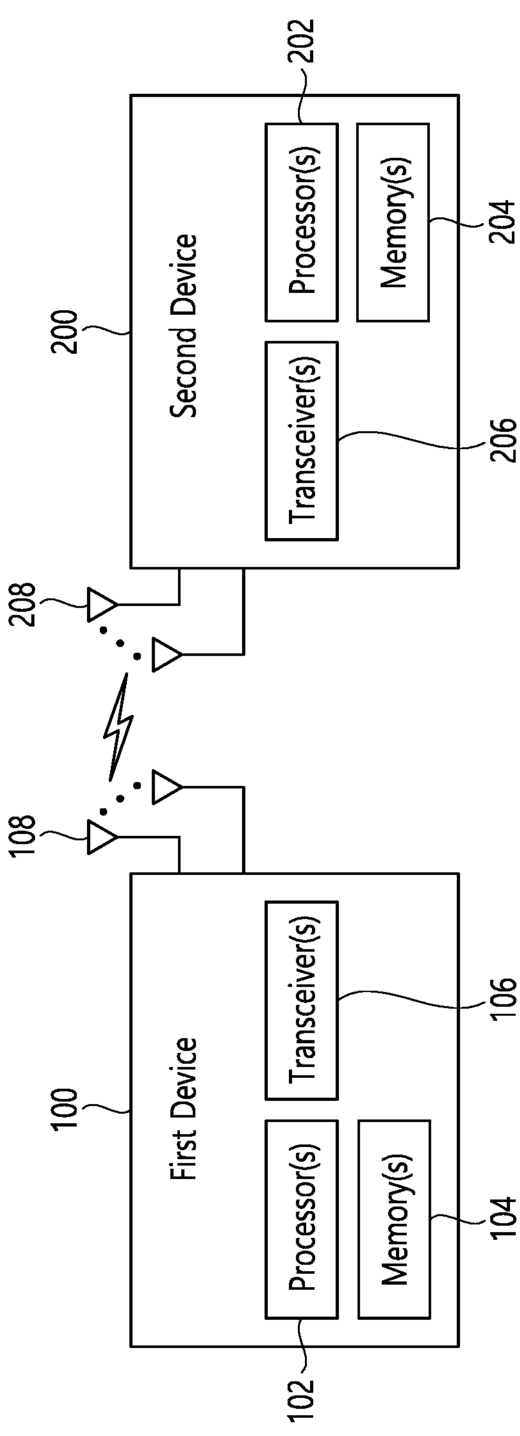
FIG. 15 shows wireless devices, based on an embodiment of the present disclosure.

FIG. 15 shows wireless devices, based on an embodiment of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
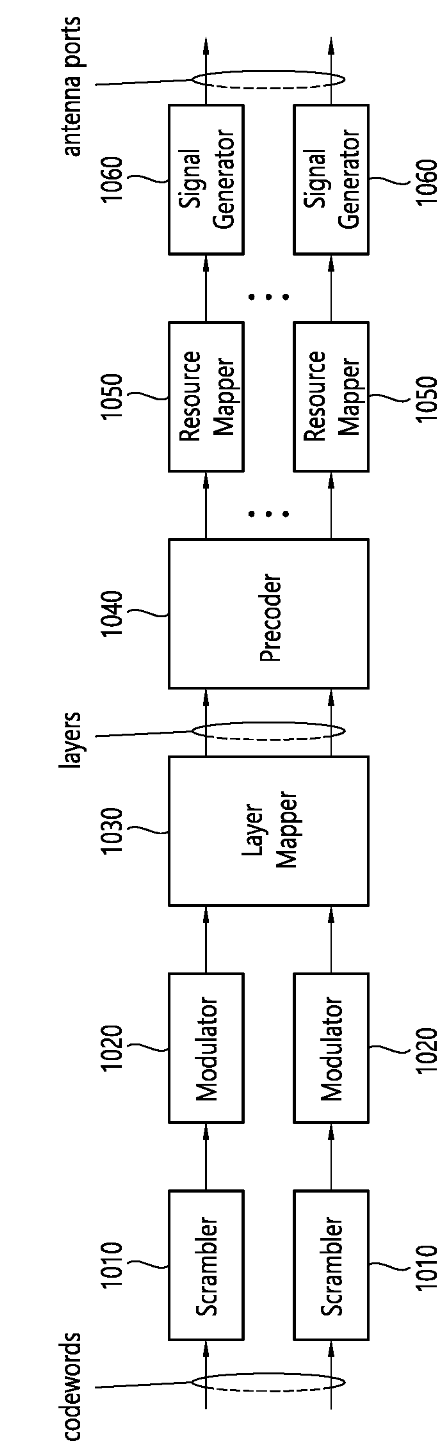
FIG. 16 shows a signal process circuit for a transmission signal, based on an embodiment of the present disclosure.

FIG. 16 shows a signal process circuit for a transmission signal, based on an embodiment of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
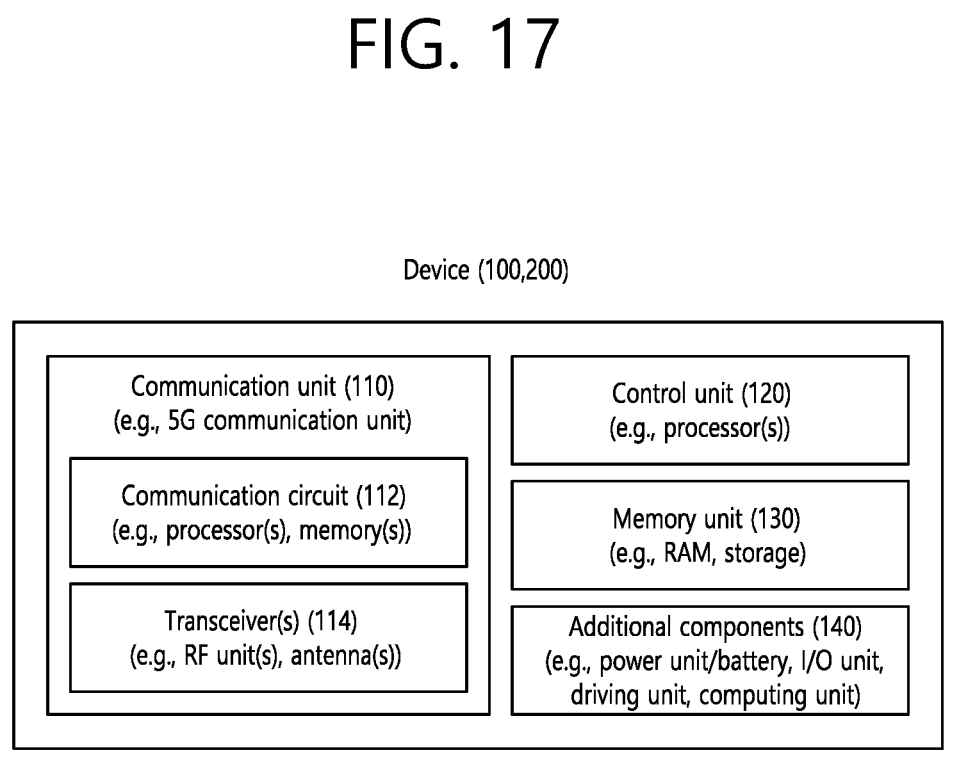

FIG. 17 shows another example of a wireless device, based on an embodiment of the present disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 14), the vehicles (100*b*-1 and 100*b*-2 of FIG. 14), the XR device (100*c* of FIG. 14), the hand-held device (100*d* of FIG. 14), the home appliance (100*e* of FIG. 14), the IoT device (100*f* of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
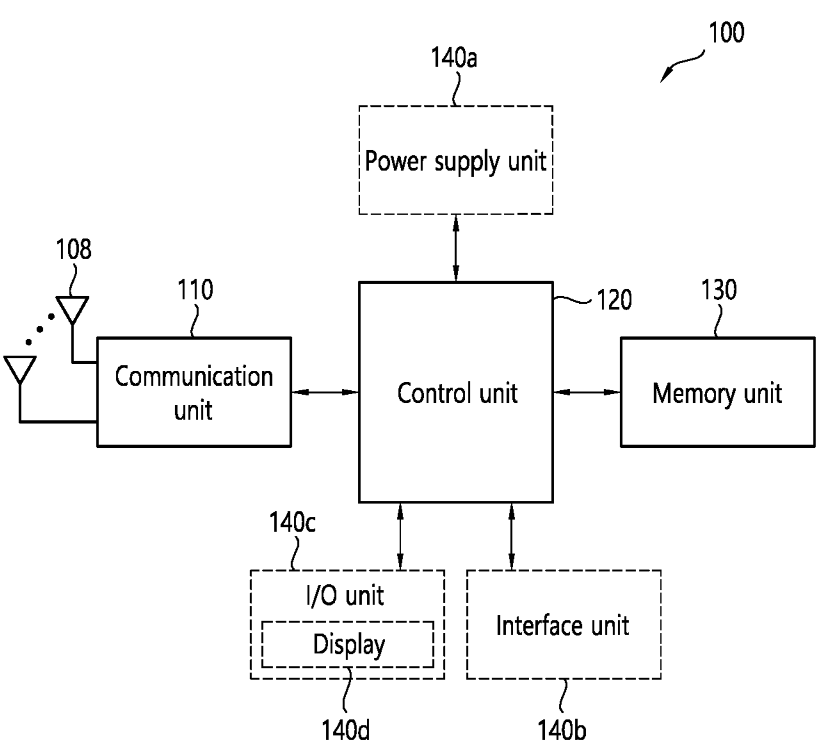
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 19, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is configured, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

transmitting information related to a time gap between a system frame number 0 related to Uu link and a direct frame number 0 related to inter-device link to a base station;

receiving information related to a first physical uplink control channel (PUCCH) resource and information related to a time gap between an inter-device physical feedback channel and a PUCCH from the base station, wherein the information related to the time gap between an inter-device physical feedback channel and a PUCCH is configured by the base station, based on the information related to the time gap between the system frame number 0 and the direct frame number 0;

transmitting inter-device control information to a second device through an inter-device physical control channel;

transmitting inter-device data, to the second device, through an inter-device physical shared channel related to the inter-device physical control channel;

determining an inter-device physical feedback channel resource, based on an index of a subchannel and an index of a slot related to the inter-device physical shared channel, wherein a first device drops a transmission of a hybrid automatic repeat request (HARQ) feedback related to the inter-device data on the first PUCCH resource, based on a time gap between the determined inter-device physical feedback channel resource and the first PUCCH resource being smaller than the time gap between a inter-device physical feedback channel and a PUCCH;

receiving information related to a second PUCCH resource, from the base station, based on the transmission of the HARQ feedback being dropped; and transmitting an acknowledgement related to the inter-device data to the base station, based on the second PUCCH resource, wherein the information related to the time gap between the system frame number 0 and the direct frame number 0 is transmitted to the base station periodically with a pre-configured period.

2. The method of claim 1, wherein the information related to the time gap between the system frame number 0 and the direct frame number 0 is transmitted to the base station based on a synchronization reference source for inter-device communication being changed.

3. The method of claim 1, further comprising:

transmitting the inter-device data, to the second device, through a resource selected by the first device, based on not performing a retransmission based on a HARQ feedback related to the inter-device data; and transmitting indication information for releasing at least one of a inter-device physical control channel resource, a inter-device physical shared channel resource, a inter-device physical feedback channel resource or a PUCCH resource, allocated to the first device by the base station.

4. The method of claim 1, further comprising:

transmitting indication information, to the base station, for releasing a periodic PUCCH resource related to the first PUCCH resource, wherein the indication information is transmitted through a third PUCCH resource of a nearest position after the first PUCCH resource.

5. The method of claim 4, wherein a HARQ process number related to the inter-device data is transmitted together with an acknowledge related to the inter-device data, by the first device to the base station.

6. A first device comprising:

one or more processors;

one or more transceivers; and one or more memories connected to the one or more processors and storing instructions, wherein the instructions, based on being executed by the one or more processors, cause the first device to:

transmit information related to a time gap between a system frame number 0 related to Uu link and a direct frame number 0 related to inter-device link to a base station;

receive information related to a first physical uplink control channel (PUCCH) resource and information related to a time gap between an inter-device physical feedback channel and a PUCCH from the base station, wherein the information related to the time gap between an inter-device physical feedback channel and a PUCCH is configured by the base station, based on the information related to the time gap between the system frame number 0 and the direct frame number 0;

transmit inter-device control information to a second device through an inter-device physical control channel;

transmit inter-device data, to the second device, through an inter-device physical shared channel related to the inter-device physical control channel;

determine an inter-device physical feedback channel resource, based on an index of a subchannel and an index of a slot related to the inter-device physical shared channel, wherein the first device drops a transmission of a hybrid automatic repeat request (HARQ) feedback related to the inter-device data on the first PUCCH resource, based on a time gap between the determined inter-device physical feedback channel resource and the first PUCCH resource being smaller than the time gap between a inter-device physical feedback channel and a PUCCH;

receive information related to a second PUCCH resource, from the base station, based on the transmission of the HARQ feedback being dropped; and transmit an acknowledgement related to the inter-device data to the base station, based on the second PUCCH resource, wherein the information related to the time gap between the system frame number 0 and the direct frame number 0 is transmitted to the base station periodically with a pre-configured period.

7. A processing device adapted to control a first device, the processing device comprising:

one or more processors; and one or more memories connected to the one or more processors and storing instructions, wherein the instructions, based on being executed by the one or more processors, cause the first device to:

transmit information related to a time gap between a system frame number 0 related to Uu link and a direct frame number 0 related to inter-device link to a base station;

receive information related to a first physical uplink control channel (PUCCH) resource and information related to a time gap between an inter-device physical feedback channel and a PUCCH from the base station, wherein the information related to the time gap between an inter-device physical feedback channel and a PUCCH is configured by the base station, based on the information related to the time gap between the system frame number 0 and the direct frame number 0;

transmit inter-device control information to a second device through an inter-device physical control channel;

transmit inter-device data, to the second device, through an inter-device physical shared channel related to the inter-device physical control channel:

determine an inter-device physical feedback channel resource, based on an index of a subchannel and an index of a slot related to the inter-device physical shared channel, wherein the first device drops a transmission of a hybrid automatic repeat request (HARQ) feedback related to the inter-device data on the first PUCCH resource, based on a time gap between the determined inter-device physical feedback channel resource and the first PUCCH resource being smaller than the time gap between a inter-device physical feedback channel and a PUCCH;

receive information related to a second PUCCH resource, from the base station, based on the transmission of the HARQ feedback being dropped; and transmit an acknowledgement related to the inter-device data to the base station, based on the second PUCCH resource, wherein the information related to the time gap between the system frame number 0 and the direct frame number 0 is transmitted to the base station periodically with a pre-configured period.

* * * * *